(12) United States Patent
Fuchikami et al.

(10) Patent No.: US 8,014,484 B2
(45) Date of Patent: Sep. 6, 2011

(54) STREAM DATA RECORDING DEVICE, STREAM DATA EDITING DEVICE, STREAM DATA REPRODUCING DEVICE, STREAM DATA RECORDING METHOD, AND STREAM DATA REPRODUCING METHOD

(75) Inventors: Michiko Fuchikami, Fukuoka (JP); Akihiro Miyazaki, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/979,585

(22) Filed: Dec. 28, 2010

(65) Prior Publication Data

US 2011/0090999 A1 Apr. 21, 2011

Related U.S. Application Data

(62) Division of application No. 11/887,187, filed as application No. PCT/JP2006/308354 on Apr. 20, 2006, now Pat. No. 7,885,366.

(30) Foreign Application Priority Data

Apr. 20, 2005 (JP) ................................. 2005-122644

(51) Int. Cl.
*H04L 25/00* (2006.01)
(52) U.S. Cl. ...................................................... 375/371

(58) Field of Classification Search .................. 375/371, 375/354, 326
See application file for complete search history.

(56) References Cited

U.S. PATENT DOCUMENTS

2003/0066094 A1 4/2003 Van der Schaar et al.
2003/0206605 A1 11/2003 Anderson

FOREIGN PATENT DOCUMENTS

| JP | 2001-309262 | 11/2001 |
| JP | 2001-320704 | 11/2001 |
| JP | 2003-125378 | 4/2003 |

OTHER PUBLICATIONS

International Search Report issued Aug. 8, 2006 in International (PCT) Application No. PCT/JP2006/308354.

*Primary Examiner* — Kevin Kim
(74) *Attorney, Agent, or Firm* — Wenderoth, Lind & Ponack, L.L.P.

(57) ABSTRACT

When recording stream data, index information and time correction information are recorded in correspondence with the stream data. The index information specifies a position of an invalid section in the stream data. The time correction information specifies a time which, supposing that a PCR included in the invalid section was able to be got, a time clock would have shown in synchronization with the PCR. When reproducing the stream data recorded together with the time correction information and the index information, at a position where the invalid section ends, the time clock can be set to a time intended by a broadcasting system, by referencing the index information and the time correction information.

7 Claims, 31 Drawing Sheets

FIG.6

META-INFORMATION

| | MISSING START TIME | MISSING END TIME | DISCONTINUITY POINT INDEX INFORMATION | TIME OFFSET VALUE |
|---|---|---|---|---|
| INVALID SECTION 1 | | | | |
| INVALID SECTION 2 | MISSING START TIME | MISSING END TIME | DISCONTINUITY POINT INDEX INFORMATION | TIME OFFSET VALUE |
| ... | | | | |

FIG.18

| | MISSING START POINT PTS | MISSING END POINT PTS | DISCONTINUITY POINT INDEX INFORMATION | REPRODUCTION PERIOD |
|---|---|---|---|---|
| INVALID SECTION 1 | | | | |
| INVALID SECTION 2 | MISSING START POINT PTS | MISSING END POINT PTS | DISCONTINUITY POINT INDEX INFORMATION | REPRODUCTION PERIOD |

META-INFORMATION

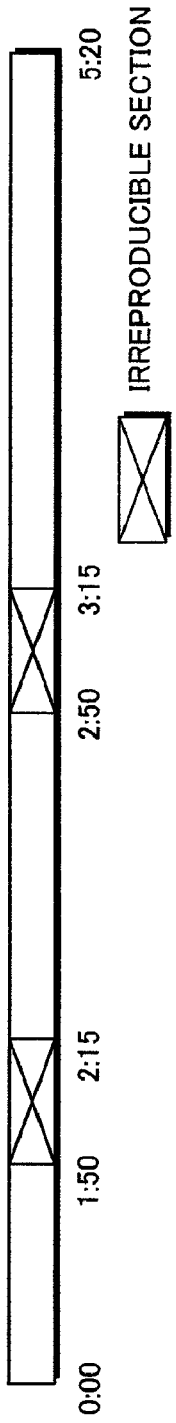
FIG.29A
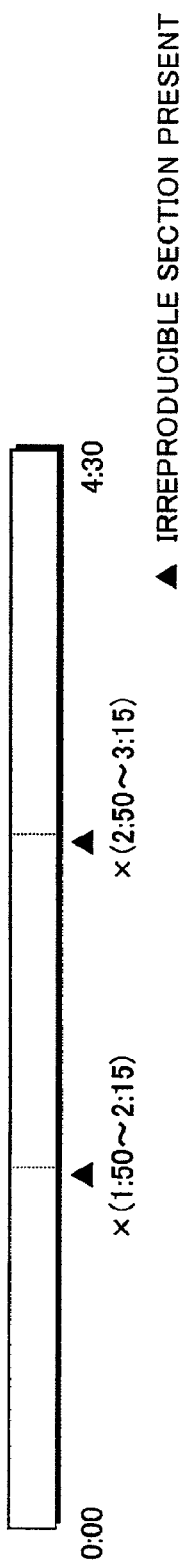
FIG.29B
FIG.29C
| TOTAL REPRODUCTION PERIOD | |
|---|---|
| BROADCAST PERIOD | 5 MINUTES AND 20 SECONDS |
| REPRODUCTION SECTION | 4 MINUTES AND 30 SECONDS |
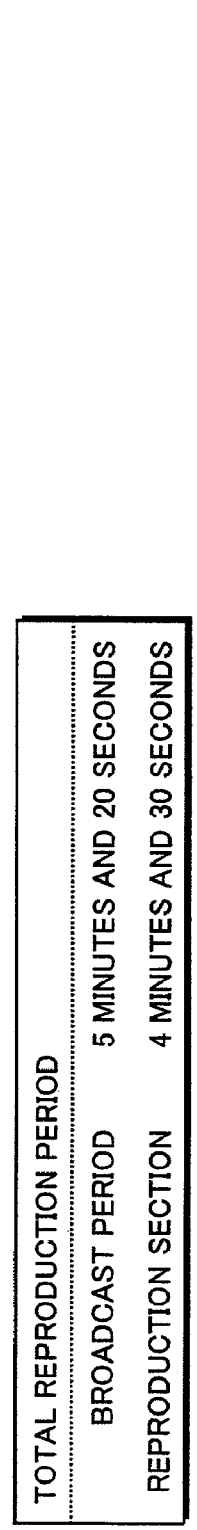
FIG.29D
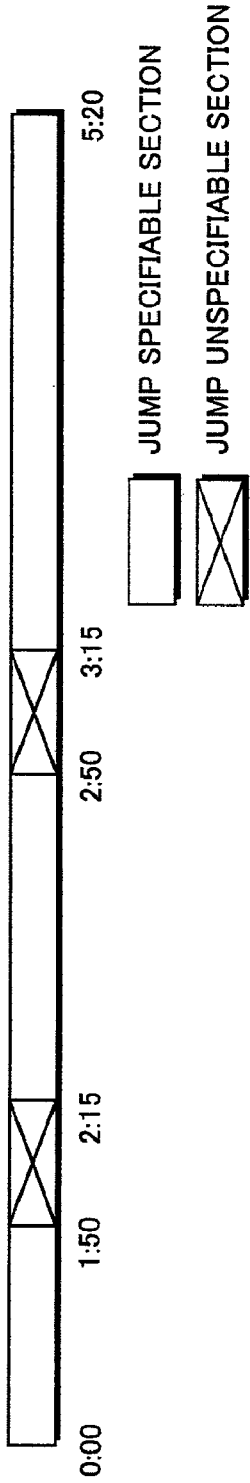

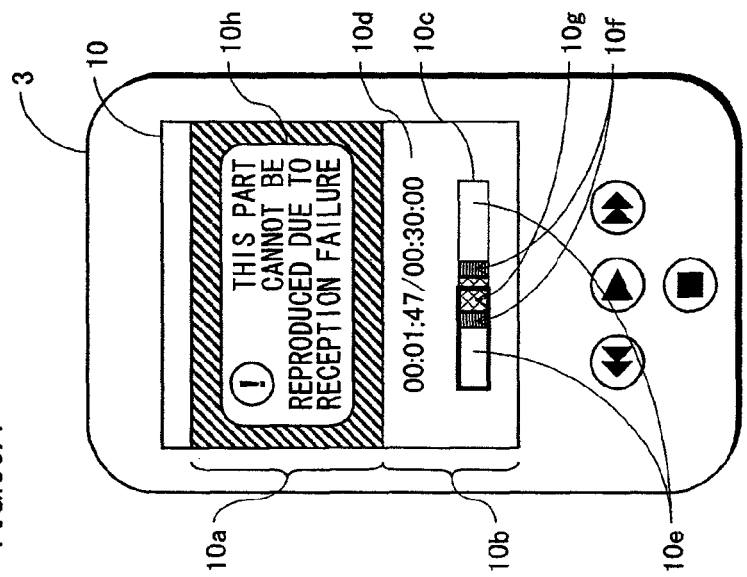

| QUALITY LEVEL | BAR OBJECT COLOR | REPRODUCTION PERIOD DISPLAY OUTPUT TIMING | WARNING DISPLAY OUTPUT TIMING |
|---|---|---|---|
| NO MISSING | GREEN | NOT DISPLAYED | NOT DISPLAYED |
| VIDEO REPRODUCIBLE (ONLY AUDIO IS MISSING) | ORANGE | | |
| AUDIO REPRODUCIBLE (ONLY VIDEO IS MISSING) | | | |
| IRREPRODUCIBLE (BOTH ARE MISSING) (BELOW PREDETERMINED PERIOD) | RED | DISPLAYED | |
| IRREPRODUCIBLE (BOTH ARE MISSING) (NO LESS THAN PREDETERMINED PERIOD) | | | DISPLAYED |

STREAM DATA RECORDING DEVICE, STREAM DATA EDITING DEVICE, STREAM DATA REPRODUCING DEVICE, STREAM DATA RECORDING METHOD, AND STREAM DATA REPRODUCING METHOD

This application is a Divisional of U.S. application Ser. No. 11/887,187, filed Apr. 27, 2010, now U.S. Pat. No. 7,885,366 which is a National Stage application of International application No. PCT/JP2006/308354, filed Apr. 20, 2006.

TECHNICAL FIELD

The present invention relates to techniques of receiving stream data that is transmitted by digital broadcasting or the like and recording the received stream data onto a recording medium, and reproducing the stream data recorded on the recording medium. Especially, the present invention relates to techniques of dealing with the case when a part of transmitted stream data is missing upon reception.

BACKGROUND ART

Conventionally, in stream data broadcasting of audio, video, and the like directed to a fixed reception terminal such as a television receiver, an error correctable coding method, for example BCH (Bose, Chaudhuri, Hocquenghem) and RS (Read Solomon), is adopted at the receiving end in order to deal with a transmission error.

A transmission error in such stream data broadcasting directed to a fixed reception terminal is caused by noise that mixes with a transmission signal due to an influence of bad weather, multipath interference induced by a wave reflected on a building, and the like.

Patent document 1: Japanese patent application publication No. 2001-309262.

DISCLOSURE OF THE INVENTION

Problems the Invention is Going to Solve

On the other hand, stream data broadcasting directed to a mobile reception terminal is expected to become widely available as a means for easily enjoying stream data such as audio and video any time and anywhere.

In the case of receiving stream data by a mobile reception terminal, the mobile reception terminal may move to a place of a poor reception condition where it is difficult for a radio wave to penetrate, and therefore a situation in which a correct transmission signal cannot be obtained for several seconds may frequently occur, unlike in the case of receiving stream data by a fixed reception terminal.

Such a situation may be unable to be dealt with by the above error correction process that is intended for transmission troubles caused by bad weather, multipath, and the like, as a result of which the stream data will end up being recorded in a partially missing state. When recording and reproducing such stream data that is partially missing due to a reception failure, the following problem arises with regard to synchronization between a broadcasting system and a reception terminal.

Firstly, synchronization between a broadcasting system and a reception terminal is described below, based on an example of using a MPEG2 TS (Transport Stream) of ISO/IEC 13818-1 that is a representative transmission format for digital broadcasting.

In stream data which is broadcast from a broadcasting system, PCR (Program Clock Reference) information showing a reference time that is to be referenced at the time of reproduction is periodically embedded in a TS header. Also, a PTS (Presentation Time Stamp) showing a presentation time of an audio frame, a video frame, or subtitle data on a time axis that is synchronous with the time of the PCR information is embedded in a header of a PES (Packetized Elementary Stream) packet multiplexed in the stream data. The PCR information and the PTS value are set and broadcast by the broadcasting system.

On the other hand, a reception terminal includes a clock (hereafter called a time clock). When reproducing the stream data, the reception terminal synchronizes the time clock with the PCR value and, when a time (hereafter called a STC (System Time Clock) value) shown by the time clock reaches the PTS of the audio or video frame set in the stream data, outputs the audio or video frame to a speaker or a monitor. In this way, audio and video are synchronously output from the reception terminal with a timing intended by the broadcasting system.

A problem that occurs when recording and reproducing partially missing stream data is described next. FIG. 1 shows a change in STC value with time, in the case where broadcast stream data cannot be received properly and a part of the stream data is missing. In FIG. 1, a horizontal axis represents a continuous time from a beginning of the broadcast stream data, whereas a vertical axis represents the STC value. Also, black circles are plotted in FIG. 1 based on timings with which PCRs are included in the stream data and values of these PCRs.

In FIG. 1, straight lines 101, 102, and 103 show the STC value. The STC value is not continuous at points A and E because, at these points A and E, the PCR information that is the basis of synchronization for the time clock is set to a value different from a value which can be estimated from a normal counting speed. Thus, the broadcasting system is capable of not only changing the PCR value at the normal counting speed but also setting the PCR value to an arbitrary value with an arbitrary timing. In this specification, a situation in which the PCR value becomes different from a value that can be estimated from the normal counting speed is referred to as "the PCR value is discontinuous", and a situation in which the PCR value is set to a discontinuous value is referred to as "the PCR is reset".

An invalid section 105 indicated by a diagonally shaded area is a section where a radio wave reception condition is poor and a TS packet cannot be got properly. In this section too, PCR reset is made by the broadcasting system at a point C. However, since the reception terminal cannot properly get a TS packet including PCR information at the point C, the reception terminal, when performing reproduction, keeps increasing the STC value as shown by the straight line 102 without resetting the STC value at the point C. After this, the reception terminal resets the STC value at the point E, based on PCR information that is got first after the radio wave reception condition recovers. This being so, the synchronization between the broadcasting system and the reception terminal is lost during a period from the point C to the point E.

In the period from the point C to the point E during which the loss of synchronization occurs, the broadcasting system assumes that the STC maintains synchronization as shown by a broken line 104, and accordingly sets a PTS of each frame so as to follow the broken line 104 and broadcasts it. As a result, in a section 106 from a point D at which the radio wave reception condition recovers to the point E at which the PCR information is first got after the recovery, despite the fact that the stream data is received properly, the reception terminal abandons each frame on the ground that its presentation time has already passed, because the STC value exceeds the PTS.

The effect of this problem is particularly serious when the broadcasting system intends to have an IDR (Instantaneous Decoder Refresh) picture displayed in this section 106 where the frame abandonment occurs.

The reason for this is given below. An IDR picture, which is a singly decodable picture, appears in a stream with a longer interval, such as 2 seconds in general and 5 seconds at the maximum, than PCR information. Accordingly, once an IDR picture is abandoned, even if PCR information is got immediately after the abandonment of the IDR picture, all pictures such as a P picture and a B picture that are not decodable without the IDR picture as a reference source cannot be decoded for several seconds until the next IDR picture is got.

Generally, the PCR value is reset to be smaller than a value that can be estimated from the normal counting speed. However, it is also possible to reset the PCR value to be larger than the value that can be estimated from the normal counting speed. If the receiver fails to detect such reset that increases the PCR value due to deterioration of the radio wave reception condition and the like, a PTS in stream data got after the radio wave reception condition recovers will exceed the STC value greatly, causing data to be output with a timing that differs from an original output timing.

In view of the above problem, the present invention aims to provide a stream data recording device which records stream data so that, even when PCR information for resetting a PCR cannot be got due to partial missing of stream data caused by deterioration in radio wave reception condition and the like, stream data properly got after recovery from the missing until getting of next PCR information can be reproduced with a timing intended by a broadcasting system. The present invention also aims to provide a stream data reproducing device that can, even when PCR information for resetting a PCR cannot be recorded due to partial missing of stream data, reproduce stream data which is properly recorded after recovery from the missing until getting of next PCR information, with a timing intended by a broadcasting system.

Means of Solving the Problems

The stated aim can be achieved by a stream data recording device that records stream data including pieces of clock reference information, the stream data recording device including: a getting unit operable to get the stream data; a time clock unit operable to count a time synchronously with a time shown by each piece of clock reference information; a detection unit operable to detect, in the got stream data, an invalid section where a part of packets of the stream data is missing; a generation unit operable to generate index information and time correction information, the index information specifying a position of an end of the invalid section in the stream data, and the time correction information being used for correcting the time of the time clock unit at the end of the invalid section, to a state identical to if the time clock unit synchronizes with a time shown by a piece of clock reference information included in the invalid section; and a recording unit operable to record the generated index information and time correction information in correspondence with the got stream data.

The stated aim can be achieved by a stream data reproducing device that reads stream data including pieces of clock reference information from a recording medium and reproduces the stream data, the stream data reproducing device including: a reading unit operable to read the stream data; a time clock unit operable to count a time synchronously with a time shown by each piece of clock reference information; an information getting unit operable to get index information and time correction information from the recording medium on which the stream data, the index information, and the time correction information are recorded, the index information specifying a position, in the stream data, of an invalid section where a part of the stream data was missing when recording the stream data, and the time correction information being used for correcting the time of the time clock unit to a state identical to if the time clock unit synchronizes with a time shown by a piece of clock reference information included in the invalid section; a resetting unit operable to reset the time clock unit based on the time correction information, when performing reproduction at the position specified by the index information; and a reproduction control unit operable to reproduce a frame in the stream data at a predefined presentation time, based on the time of the time clock unit.

Effects of the Invention

According to the above construction, the stream data recording device to which the present invention relates records, if missing occurs when receiving stream data, time correction information and index information onto a recording medium together with the partially missing stream data, where the time correction information specifies a value of the time clock unit in the case where the time clock unit synchronizes with PCR information included in the invalid section, and the index information specifies a position of the invalid section in the stream data.

When reproducing the recorded stream data, the stream data reproducing device to which the present invention relates can set the time clock unit to a time intended by a broadcasting system at a position where the invalid section ends, by referencing the index information and the time correction information.

In this way, even when PCR information included in an invalid section indicates PCR reset, it is possible to synchronize the time clock unit with a time intended by a broadcasting system, during a section from recovery from the missing to getting of next PCR information. As a result, stream data got during this section can be reproduced with a timing intended by the broadcasting system.

BRIEF DESCRIPTION OF THE DRAWINGS

FIG. 6 shows a data structure of meta-information according to a first embodiment.

FIG. 18 shows a data structure of meta-information according to a second embodiment.

FIG. 29A shows a screen display example of informing a user that an irreproducible section exists in recorded stream data.

FIG. 29B shows another screen display example of informing the user that an irreproducible section exists.

FIG. 29C shows a screen display example of informing the user of a total reproduction period at the time of timer recording and a reproducible period of recorded stream data.

FIG. 29D shows a display example of informing of a section that can be specified as a jump destination and a section that cannot be specified as a jump destination, when requesting to specify a jump destination.

FIG. 30A schematically shows a stream data reproducing device 3 that displays an image showing a reproduction status.

FIG. 30B shows an example method of displaying an image showing a reproduction status.

DESCRIPTION OF REFERENCE NUMERALS

Figure 1:
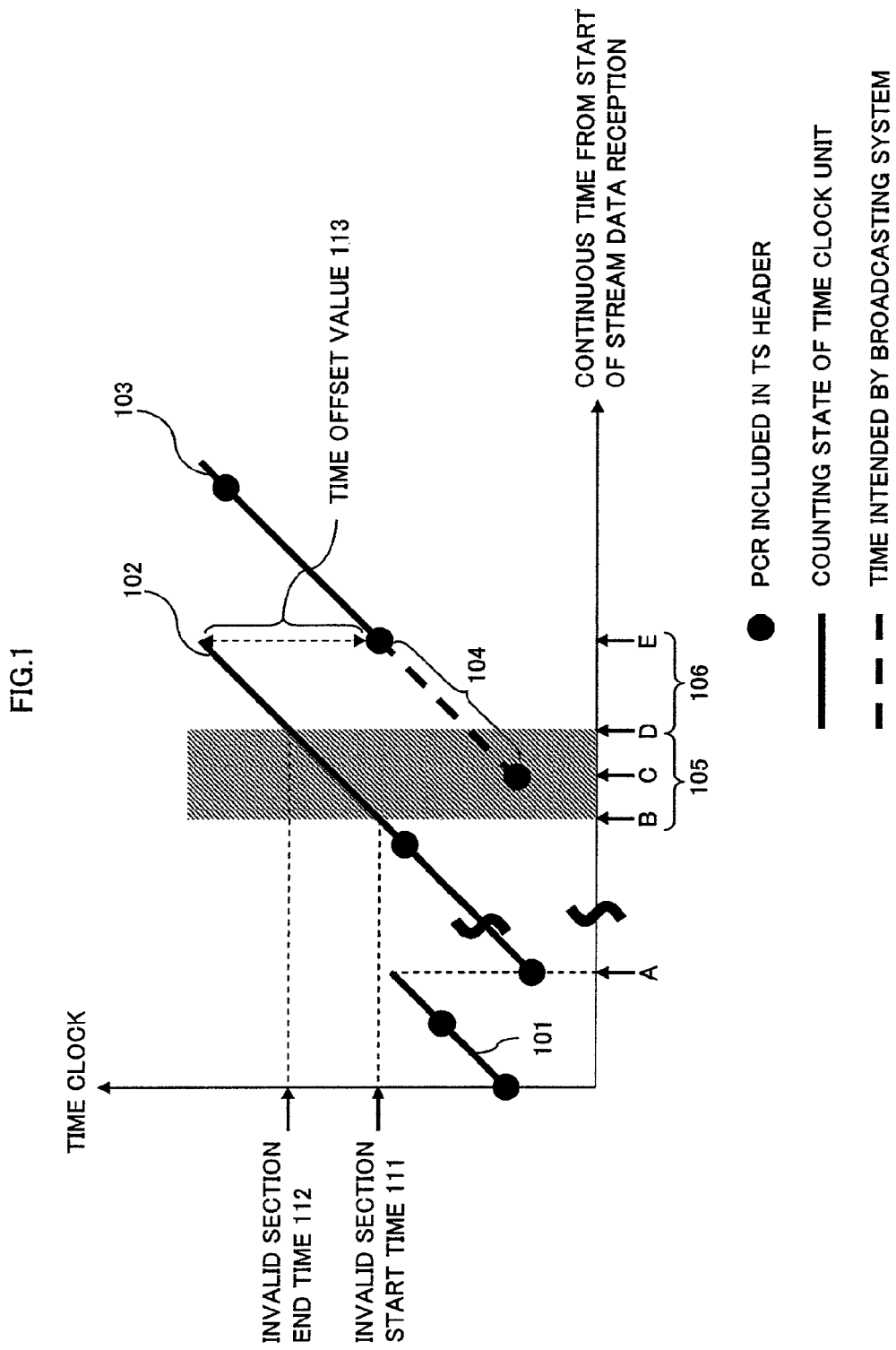
FIG. 1 shows a change in STC value with time, when broadcast stream data cannot be received properly and partial missing of stream data occurs.

1 . . . broadcasting system
2 . . . transmission antenna
3 . . . mobile reception terminal
4 . . . recording medium
5 . . . stream data recording device
6 . . . stream data reproducing device
7 . . . stream data recording device
8 . . . stream data reproducing device
9 . . . stream data reproducing device
10 . . . monitor
10a . . . image output part
10b . . . status display part
10c . . . reproduction position display bar object
10d . . . reproduction period display
10e . . . section
10f . . . section
10g . . . section
10h . . . pop-up
11 . . . getting unit
12 . . . packet analysis unit
13 . . . missing detection unit
14 . . . time clock unit
15 . . . reset detection unit
16 . . . meta-information generation unit
17 . . . recording control unit
18 . . . reproduction period calculation unit
19 . . . meta-information generation unit
21 . . . getting unit
22 . . . decoding unit
23 . . . output unit
24 . . . meta-information analysis unit
25 . . . time clock control unit
26 . . . time clock unit
27 . . . time clock unit
28 . . . decoding unit
29 . . . meta-information analysis unit
30 . . . time clock control unit
31 . . . decoding unit
32 . . . time clock control unit
33 . . . status display unit

BEST MODE FOR CARRYING OUT THE INVENTION

The following describes a best mode for carrying out the present invention, with reference to drawings.

First Embodiment

System Overview

Figure 2:
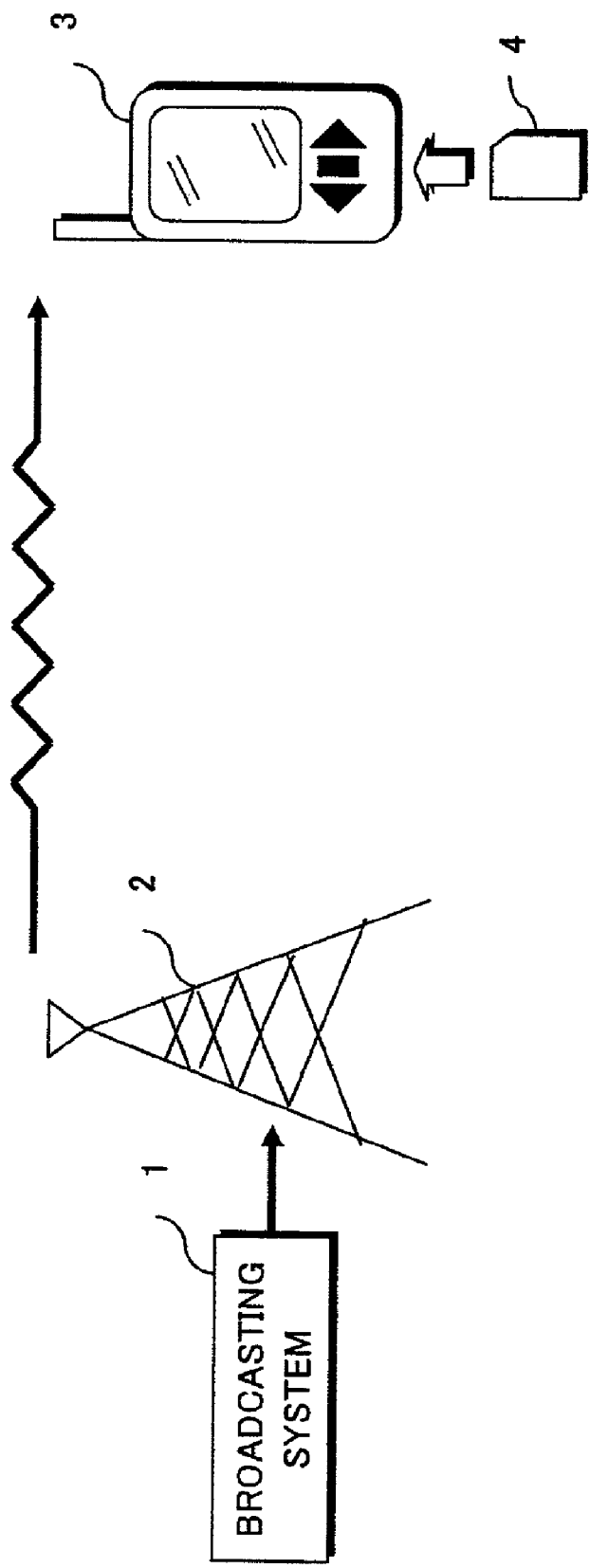
FIG. 2 shows a form of use of a stream data recording device and a stream data reproducing device according to the present invention.

First, a form of use out of forms of implementing a stream data recording device and a stream data reproducing device according to the present invention is described below. FIG. 2 shows a form of use of the stream data recording device and the stream data reproducing device according to the present invention. In FIG. 2, the stream data recording device and the stream data reproducing device according to the present invention are included in a mobile reception terminal 3. The mobile reception terminal 3 is used to receive a broadcast wave that is transmitted from a broadcasting system 1 via a transmission antenna 2, get stream data from the received broadcast wave, and record the got stream data onto a recording medium 4, and also used to read the stream data recorded on the recording medium 4 and reproduce the read stream data.

The broadcasting system 1 generates stream data of digital broadcasting.

The transmission antenna 2 transmits the stream data generated by the broadcasting system 1 on a digital broadcasting radio wave.

The recording medium 4 is used for recording/holding data. Examples of the recording medium 4 include an optical disc, a magnetic disk, and a semiconductor memory.

This completes the description of the form of use of the stream data recording device and the stream data reproducing device according to the present invention.

The following describes stream data that is subjected to recording/reproduction, in detail.

<Stream Data>

Figure 3:
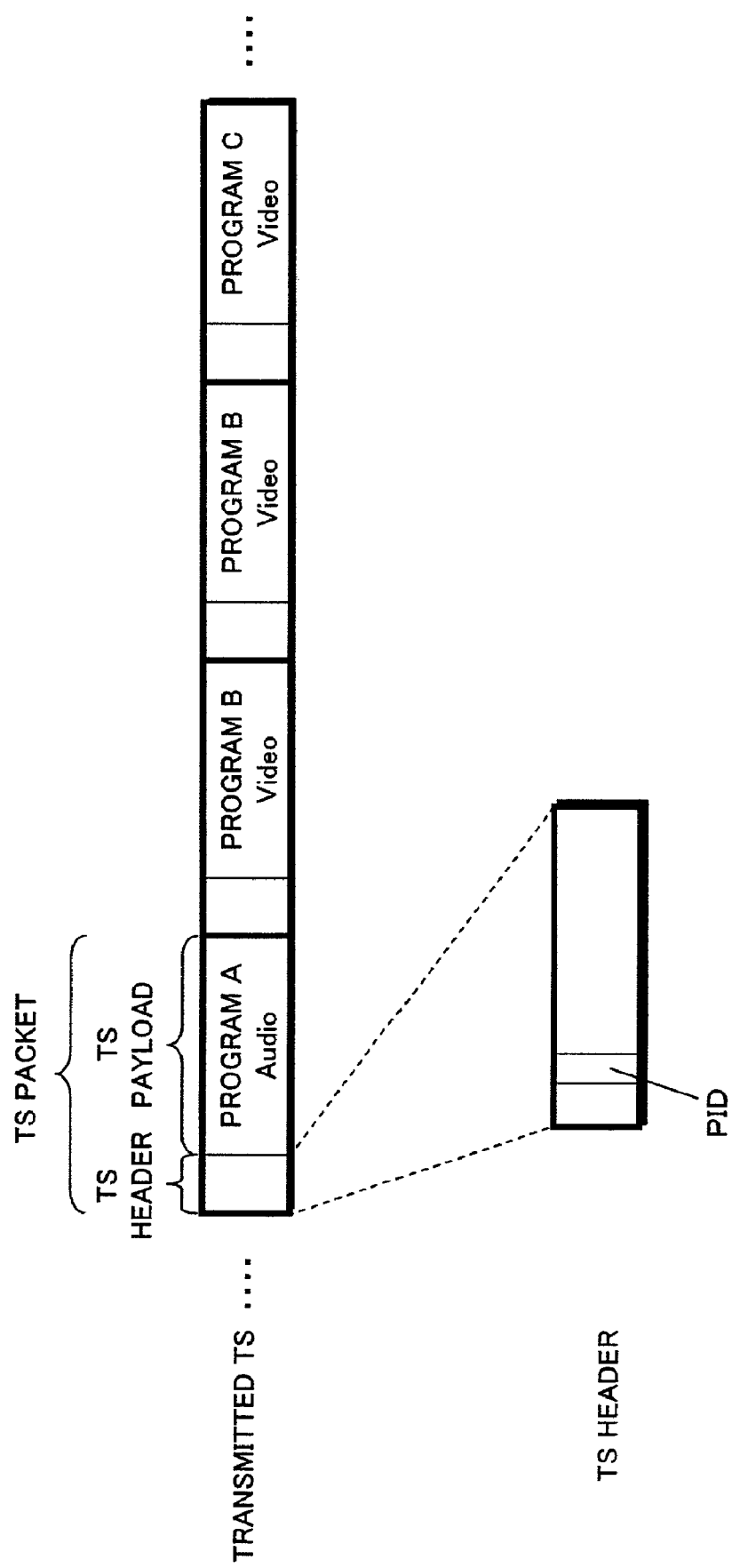
FIG. 3 shows an example data structure of a TS.

An ISO/IEC 13818-1 MPEG2 TS is a representative example of a transmission format used in digital broadcasting. This embodiment describes an example where a MPEG2 TS is used as stream data. FIG. 3 shows an example data structure of the TS.

The first tier shows TS packets. In the TS, stream data of a plurality of programs is divided into packets called TS packets for each of audio data, video data, and subtitle data, and these TS packets are multiplexed with each other and transmitted. A TS packet is made up of a header part and a payload part, with audio data, video data, or subtitle data being stored in the TS payload.

The second tier shows the header of the TS packet. The header of each TS packet includes an identifier called a PID (Packet Identifier) for identifying the TS packet. TS packets storing audio data, video data, and subtitle data of each program have different identifiers depending on the type of stored data.

Also, PCR information used for synchronization between the broadcasting system 1 which generates the stream data and the mobile reception terminal 3 which receives the stream data and reproduces/records the stream data is embedded in a header of a TS packet to which a specific PID is assigned.

PIDs of TS packets in which PCR information is embedded and TS packets which store audio data, video data, and subtitle data of programs are shown by a PMT (Program Map Table). The mobile reception terminal 3 identifies received TS packets using PIDs, to get TS packets of a program that is to be reproduced/recorded.

<Data Structure of a TS Payload>

Payload parts of TS packets store various types of stream data that constitute a program including audio data and video data compressed according to standards such as ISO/IEC 13818-7 MPEG2 AAC (Advanced Audio Coding) and ISO/IEC 14496-10 MPEG4 AVC (Advanced Video Coding) and subtitle data in 8-unit character code specified by ARIB STD-B8, ARIB STD-B24, or the like, information showing a program structure such as a PMT, and the like. Hereafter, each element constituting a program, such as audio, video, and subtitles, is collectively referred to as a "component".

Figure 4:
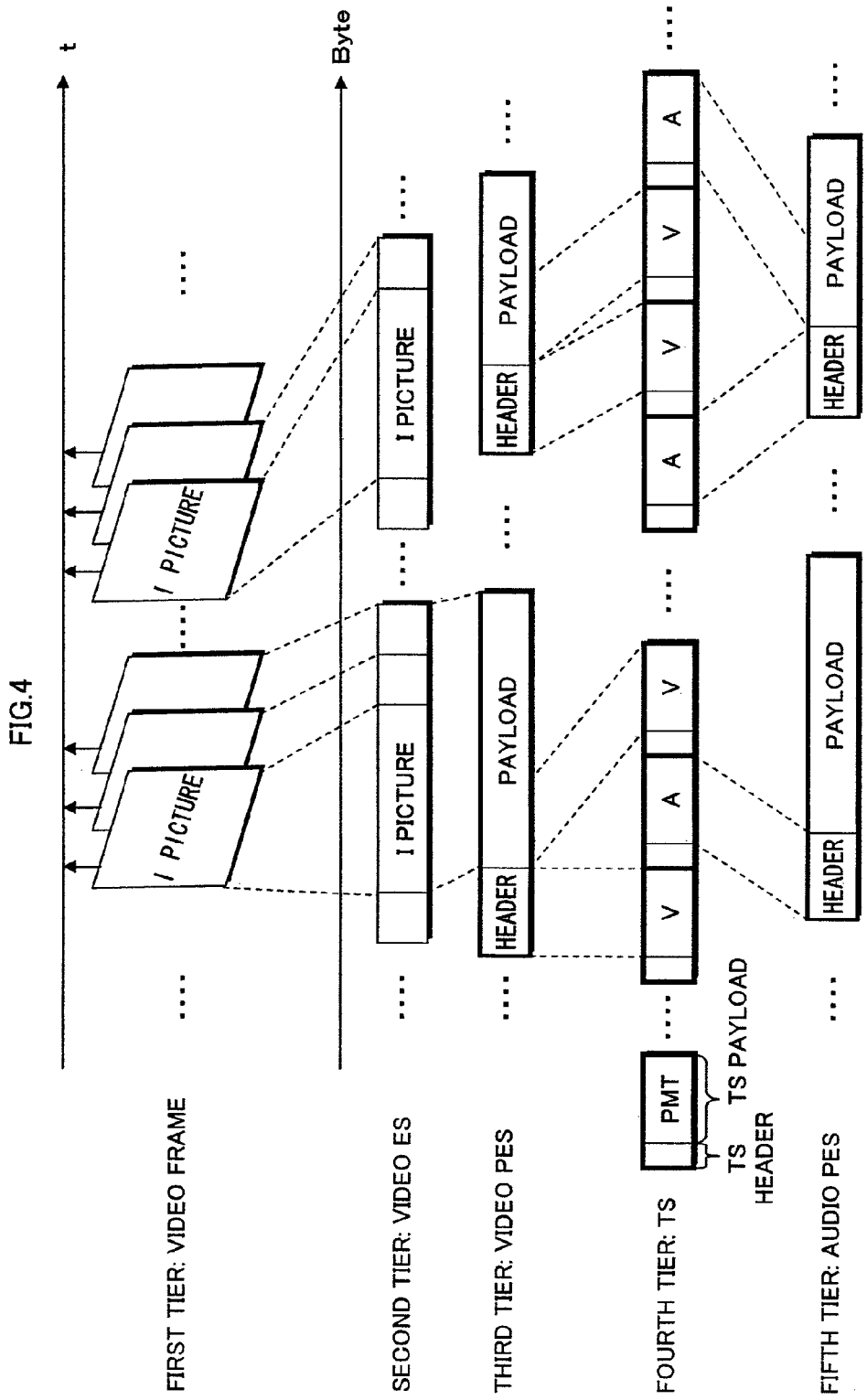
FIG. 4 shows an example data structure of video data and audio data included in a payload part of a TS packet.

FIG. 4 shows an example data structure of video data and audio data included in payload parts of TS packets.

In FIG. 4, the fourth tier shows a TS. The third tier shows PES packets of video data, while the fifth tier shows PES packets of audio data. A PES packet can be stored within one TS payload or over a plurality of TS payloads.

Each PES packet is composed of a header part and a payload part. A header part of a PES packet includes a PTS showing a presentation time at which data stored in a payload part is to be output to a monitor or a speaker. A value of the PTS is set by the broadcasting system 1 on an assumption that each component will be synchronously output by referencing a STC value of the mobile reception terminal 3 which is corrected according to PCR information. Therefore, when PCR reset occurs, a PTS of a component included in subsequently transmitted stream data is set to a value that is discontinuous from a preceding frame.

An ES (Elementary Stream) is formed by connecting PES payloads.

The second tier shows a video ES. The ES is compressed data. In the case of a MPEG standard such as MPEG4 AVC, a video ES is composed of an IDR picture that can be decoded singly, a P picture that requires preceding picture data, and a B picture that requires preceding/succeeding picture data. Each IDR picture is stored in a PES packet so as to be located at a beginning of a payload part.

The first tier shows video frames. The video frames are obtained by decoding the compressed video ES.

This completes the detailed description of the stream data.

<Stream Data Recording Device>

Figure 5:
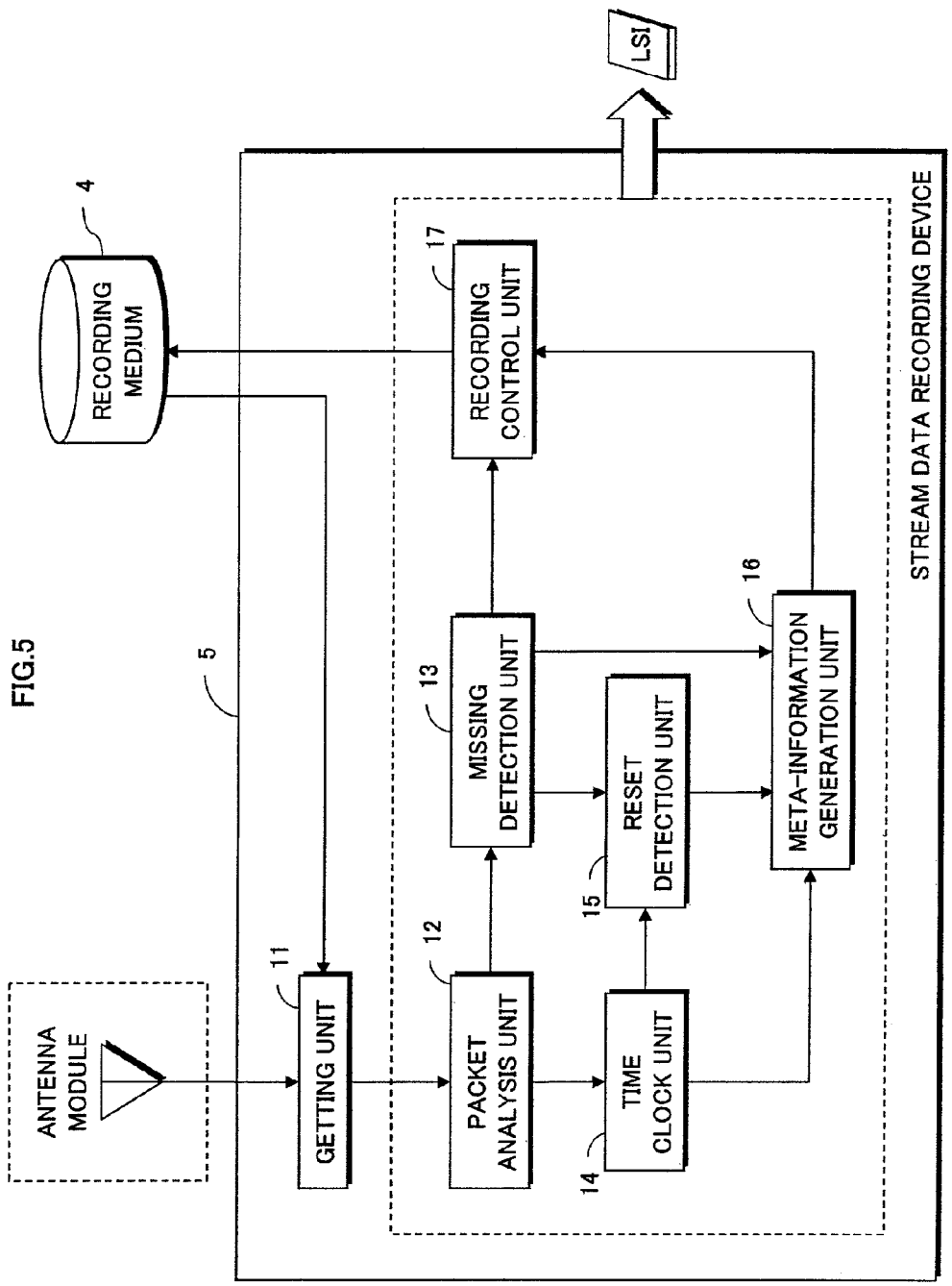
FIG. 5 shows an internal construction of a stream data recording device according to an embodiment.

The following describes the mobile reception terminal 3 according to an embodiment, in detail. First, a construction for recording stream data in the mobile reception terminal 3 is described below. A stream data recording function is realized by a stream data recording device 5 included in the mobile reception terminal 3. FIG. 5 shows an internal construction of the stream data recording device 5.

The stream data recording device 5 includes a getting unit 11, a packet analysis unit 12, a missing detection unit 13, a time clock unit 14, a reset detection unit 15, a meta-information generation unit 16, and a recording control unit 17.

The getting unit 11 receives a broadcast wave transmitted from the transmission antenna 2 shown in FIG. 2 in an antenna module, and outputs a TS transmitted via the broadcast wave to the packet analysis unit 12. Also, when a decrease and recovery of a C/N level or a loss and recovery of RF synchronization are detected in the antenna module, the getting unit 11 notifies the packet analysis unit 12 of the detection. Hereafter, detection of a decrease of a C/N level or a loss of RF synchronization in the antenna module is referred to as a "data reception failure start", and detection of recovery of a C/N level or recovery of RF synchronization is referred to as a "data reception failure end".

The packet analysis unit 12 gets a TS packet including a recording target PID by analyzing a TS header, and outputs the TS packet to the missing detection unit 13, based on an instruction from a user. Here, if PCR information relating to a recording target program is included in the TS header, the packet analysis unit 12 extracts the PCR information and outputs it to the time clock unit 14. During a period from when a data reception failure start is notified to when a data reception failure end is notified by the getting unit 11, however, the packet analysis unit 12 abandons a TS packet without analyzing a header, and transfers the notification of the data reception failure start and the data reception failure end to the missing detection unit 13. Also, when unable to properly analyze a TS header due to a reason such as data of a TS packet containing errors that cannot be corrected by an error correction process, the packet analysis unit 12 generates the same notification as the notification of the data reception failure start and the data reception failure end by the getting unit 11, and transfers the generated notification to the missing detection unit 13.

The missing detection unit 13 detects whether or not an invalid section that is not subjected to reproduction occurs in received stream data, and notifies the reset detection unit 15 and the meta-information generation unit 16 of a result of the detection. The invalid section occurs, for example, when a radio wave reception condition deteriorates during stream data recording and a recording target TS packet cannot be got properly.

When no invalid section is detected, the missing detection unit 13 outputs a TS packet got from the packet analysis unit 12 to the recording control unit 17. When an invalid section is detected, the missing detection unit 13 outputs a discontinuous packet indicating that a packet preceding the discontinuous packet and a packet succeeding the discontinuous packet are not continuous with each other, to the recording control unit 17.

The missing detection unit 13 detects an invalid section according to one of the following methods 1) to 3).

1) A method of detecting a period from when a data reception failure start is notified to when a data reception failure end is notified, as an invalid section.

2) A method of detecting a loss of continuity between packets, by analyzing TS packets which have been got at the time of judgment.

3) A method of detecting a case where information, such as PCR information, that is cyclically included in a TS (hereafter called "cyclically transmitted information") is not detected over a maximum transmission cycle from when detected in a previously got TS packet.

As specific examples of the above method 2), a loss of continuity between packets can be detected in cases such as the following 2-1) and 2-2).

2-1) A missing number occurs in values of a continuity_counter that are serially assigned to TS packets storing components.

2-2) There is no PCR reset in a TS packet got at the time of judgment, despite the fact that a discontinuity_indicator is valid in an immediately preceding TS packet having the same PID.

The discontinuity_indicator is information which is set in an adaptation field of a TS packet. When the discontinuity_indicator is valid, it indicates that PCR reset occurs in a succeeding TS packet having the same PID.

To detect an invalid section according to the above method 3), the missing detection unit 13 holds a STC value got from the time clock unit 14 at the time when the cyclically transmitted information is last detected, in its internal storage area. The missing detection unit 13 compares a STC value of the time clock unit 14 with the STC value held in the internal storage area, and detects an invalid section when a difference between the two STC values exceeds the maximum transmission cycle of the cyclically transmitted information. Alternatively, the missing detection unit 13 may get a STC value upon detecting newest cyclically transmitted information, calculate a difference between the got STC value and the STC value got when detecting the preceding cyclically transmitted information and held in the internal storage area, and judge that an invalid section has occurred if the difference exceeds the maximum transmission cycle of the cyclically transmitted information.

The cyclically transmitted information used for detecting an invalid section is not limited to PCR information. Any information whose maximum transmission cycle of being included in stream data has been set, e.g. a PAT, a PMT, a NIT, a TOT, a TDT, an EIT, and a PTS which is included in stream data for reproduction, is equally applicable.

The time clock unit 14 has an internal clock, and synchronizes the internal clock to a PCR value by referencing PCR information got from the packet analysis unit 12. A value (a STC value) of the internal clock in the time clock unit 14 is referenced by the missing detection unit 13, the reset detection unit 15, and the meta-information generation unit 16. Also, each time the time clock unit 14 gets PCR information from the packet analysis unit 12, the time clock unit 14 notifies the meta-information generation unit 16 of the getting of the PCR information.

The reset detection unit 15 gets a result of detecting an invalid section from the missing detection unit 13, performs a process of detecting whether or not PCR reset occurred in the invalid section by referencing the STC value of the time clock unit 14, and notifies a result of the detection to the meta-information generation unit 16.

The meta-information generation unit 16 generates meta-information based on the detection results of the missing detection unit 13 and the reset detection unit 15. The meta-information is data that shows a structure and an attribute of the stream data.

FIG. 6 shows a data structure of meta-information in this embodiment. The meta-information in this embodiment is made up of a same number of records as invalid sections detected in the stream data, where each record is composed of a "missing start time", a "missing end time", "discontinuity point index information", and a "time offset value".

The "missing start time" is a STC value when an invalid section occurs. An invalid section start time 111 shown in FIG. 1 corresponds to this.

The "missing end time" is a STC value when the invalid section ends. An invalid section end time 112 shown in FIG. 1 corresponds to this.

The "discontinuity point index information" is a data position of a TS packet from which recording is resumed after the invalid section ends. A data position of a packet that is recorded first after the point D in FIG. 1 corresponds to this. A serial number starting from a top packet of a recording target TS, an offset value from a file beginning, or the like can be used as data index information. An offset value from a file beginning is used in this embodiment.

The "time offset value" is a difference between a STC value and a PCR value when getting of PCR information is notified first after the invalid section ends. A time offset value 113 in FIG. 1 corresponds to this.

Figure 7:
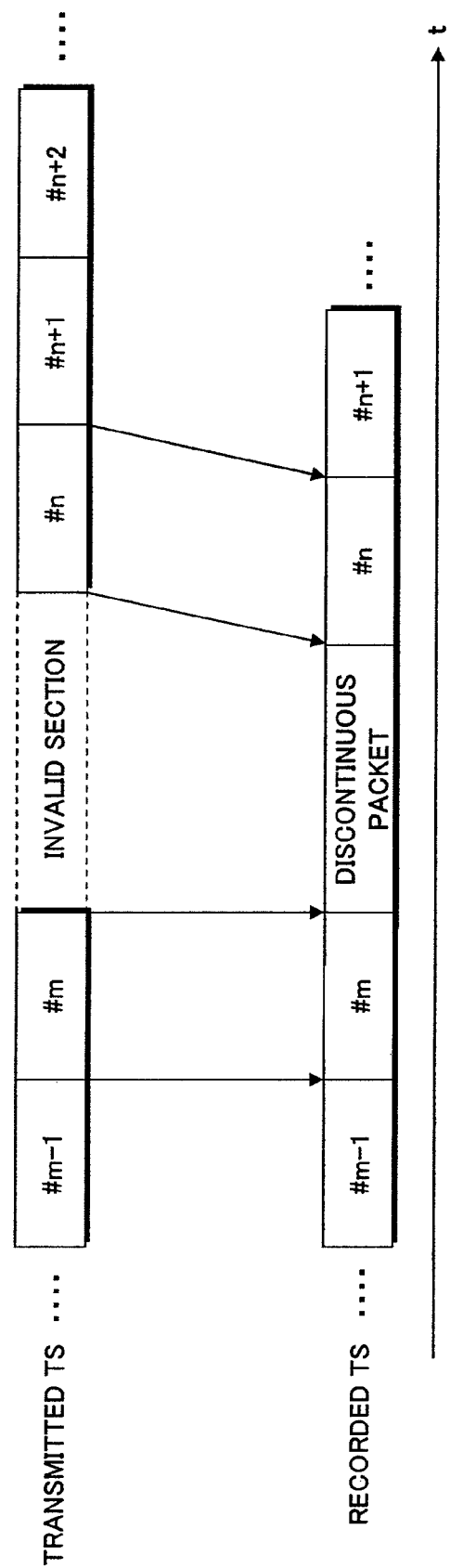
FIG. 7 shows TS packets recorded when an invalid section occurs.

The recording control unit 17 in FIG. 5 records stream data output from the missing detection unit 13 while no invalid section is detected, and meta-information generated by the meta-information generation unit 16, onto the recording medium 4 in correspondence with each other. Since a discontinuous packet is output from the missing detection unit 13 when an invalid section is detected, the stream data recorded by the recording control unit 17 has the discontinuous packet inserted at a position where a TS packet is missing due to the occurrence of the invalid section, as shown in FIG. 7.

This completes the description of the construction of the stream data recording device.

<Stream Data Recording Method>

The following describes an operational procedure of the stream data recording device 5.

Figure 8:
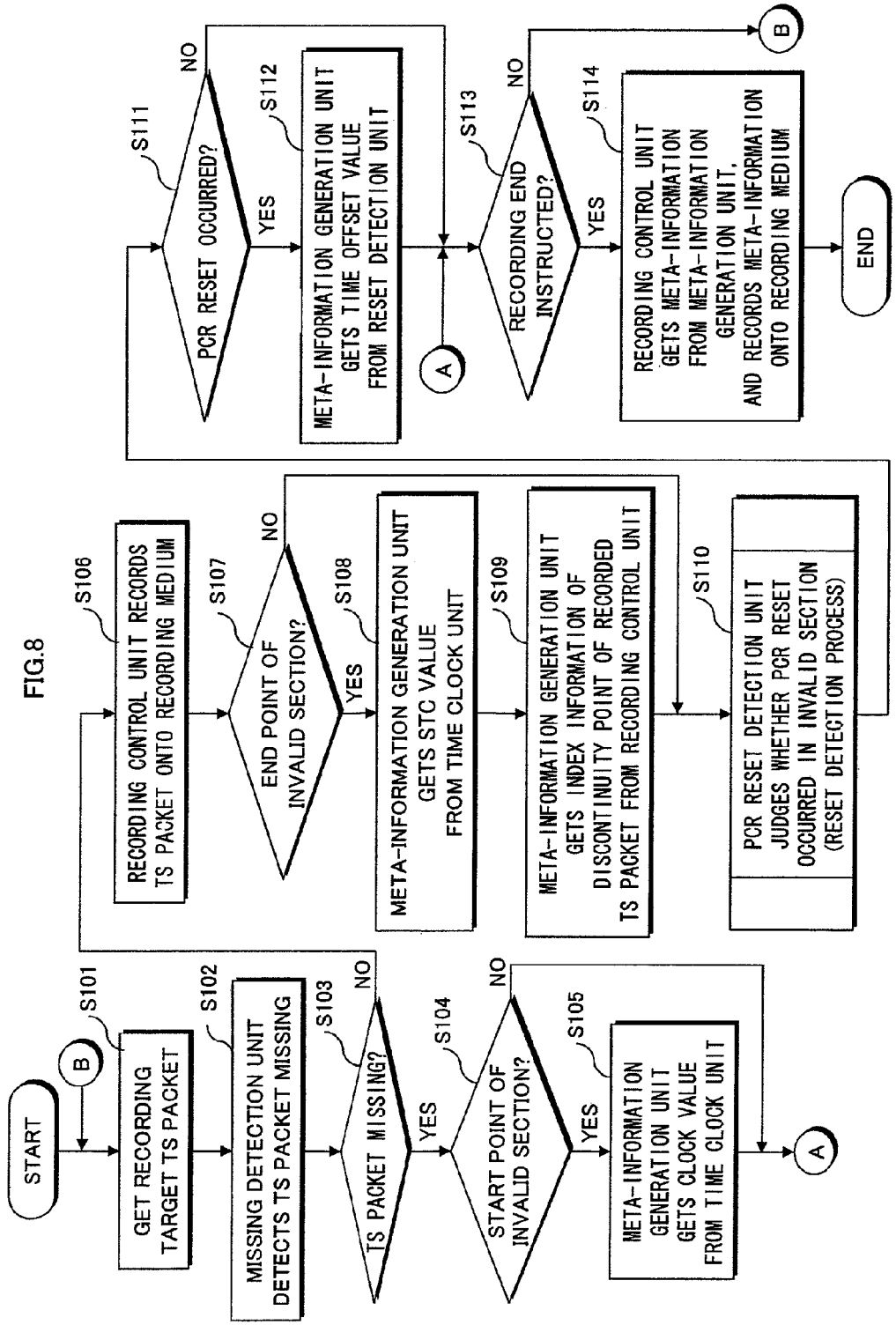
FIG. 8 is a flowchart showing a procedure of a stream data recording process in a stream data recording device 5.

FIG. 8 shows a procedure of a stream data recording process in the stream data recording device 5 according to this embodiment. The procedure shown in FIG. 8 is executed upon receiving a recording instruction from the user, and can be divided into the following four main steps 1 to 4.

1. A step of detecting an occurrence of an invalid section and getting a missing start time (steps S101-S105).

2. A step of detecting the end of the invalid section and getting a missing end time and discontinuity point index information (steps S106-S109).

3. A step of detecting PCR reset that occurred in the invalid section and getting a time offset value (steps S110-S112).

4. A step of recording generated meta-information (steps S113-S114).

Steps S101-S105 for detecting an occurrence of an invalid section in recorded stream data are described first.

When a recording process is launched in response to a recording instruction from the user, a TS packet having a recording target PID is got as a result of reception of a broadcast wave by the getting unit 11 and filtering by the packet analysis unit 12 (step S101). In step S102, the missing detection unit 13 judges whether or not missing occurs in recording target TS packets got by the packet analysis unit 12. In this TS packet missing detection process, one of the following methods 1) to 3) is employed.

1) A method of detecting a period from when a data reception failure start is notified to when a data reception failure end is notified by the getting unit 11 or the packet analysis unit 12, as an invalid section.

2) A method of detecting discontinuity of data included in packets, by analyzing TS packets that have been got at the time of judgment.

3) A method of detecting a case where the cyclically transmitted information is not detected over the maximum transmission cycle from when the cyclically transmitted information was last detected in a previously got TS packet.

When TS packet missing is detected in the missing detection process (step S103: YES), the missing detection unit 13 judges whether the detected point is a start point of an invalid section or a point within an invalid section (step S104). The judgment as to whether or not the detected point is the start point of the invalid section can be made by, for example, using a flag held in the internal storage area of the missing detection unit 13. The missing detection unit 13 sets the flag ON when judging that the detected point is a start point of an invalid section, and OFF when judging that the detected point is an endpoint of an invalid section. In step S104, when the missing is detected, the missing detection unit 13 judges that the detected point is a start point of an invalid section if the flag is OFF, and judges that the detected point is a point within an invalid section if the flag is ON.

When the detected point is a start point of an invalid section (step S104: YES), the missing detection unit 13 notifies the meta-information generation unit 16 of the start of the invalid section. The meta-information generation unit 16 gets a STC value from the time clock unit 14 upon receiving the notification, and holds the STC value as "missing start time" information of meta-information (step S105). Though not shown in the flowchart, a clock speed in the time clock unit 14 is controlled so as to synchronize with PCRs included in TS headers.

When the detected point is not the start point of the invalid section but a point within the invalid section (step S104: NO), the missing detection unit 13 and the meta-information generation unit 16 do not perform any process.

Next, the end of the invalid section is detected, and a missing end time and discontinuity point index information are got (steps S106-S109).

When no TS packet missing is detected by the missing detection unit 13 (step S103: NO), the recording control unit 17 gets a TS packet from the missing detection unit 13, and records the TS packet onto the recording medium 4 (step S106). Here, instead of recording one TS packet at a time, the recording control unit 17 may record, when data of a predetermined size is accumulated, the accumulated data onto the recording medium 4. Also, the TS packet recording may be performed with a different timing, so long as it is between steps S106 and S113.

The missing detection unit 13 judges whether or not a properly received TS packet is at an end point of the invalid section (step S107). This judgment of step S107 can be made by using the flag held in the missing detection unit 13, as in the judgment of step S104. Since the missing detection unit 13 sets the flag ON when judging that the detected point is a start point of an invalid section, and OFF when judging that the detected point is an end point of an invalid section, if the flag is ON when a TS packet is properly received, the missing detection unit 13 can judge that the properly received TS packet is at the end point of the invalid section.

When the properly received TS packet is at the end point of the invalid section as a result of the judgment of step S107 (step S107: YES), the missing detection unit 13 notifies the meta-information generation unit 16 of the end of the invalid section. The meta-information generation unit 16 gets a STC value from the time clock unit 14 upon receiving the notification, and holds the STC value as "missing end time" information of the meta-information (step S108). Also, the meta-information generation unit 16 gets recording index information of the TS packet from the recording control unit 17, and holds the recording index information as "discontinuity point index information" of the meta-information (step S109). A number that begins at a top one of recording target TS packets, an offset value from a file beginning, or the like can be used as the recording index information of the TS packet. If the properly received TS packet is not at the end point of the invalid section as a result of the judgment of step S107 (step S107: NO), steps S108 and S109 are not performed.

Next, PCR reset is detected, and a time offset value is got (steps S110-S112).

In step S110, the reset detection unit 15 executes a reset detection process of judging whether or not PCR reset occurred in the invalid section. The reset detection process will be described in detail later. If the PCR reset occurred in the invalid section (step S111: YES), the reset detection unit 15 notifies the meta-information generation unit 16 of a result of detecting the occurrence of the PCR reset, and outputs a time offset value. The meta-information generation unit 16 gets the time offset value from the reset detection unit 15, and holds the time offset value as a "time offset value" of the meta-information (step S112). If no PCR reset occurred in the invalid section (step S111: NO), step S112 is not performed.

Lastly, the generated meta-information is recorded at the end of the TS recording (steps S113-S114).

The recording control unit 17 judges whether or not a recording end instruction, such as a recording end instruction made by the user or a recording end instruction according to a recording end time, is issued (step S113). When a recording end instruction is issued (step S113: YES), the recording control unit 17 gets the meta-information from the meta-information generation unit 16, and records the meta-information onto the recording medium 4 (step S114). If no recording end instruction is issued (step S113: NO), the procedure returns to step S101 to process a next TS packet.

This completes the description of the operational procedure of the stream data recording device 5.

This embodiment describes the case where the meta-information is written onto the recording medium all at once at the end of the stream data recording, in step S114. Instead, the meta-information may be recorded onto the recording medium one record at a time. For instance, if information for one record has already been generated when judging whether or not a recording end instruction is issued in step S113, the information for one record held in the meta-information generation unit 16 may be output to the recording control unit 17 and written onto the recording medium. Alternatively, a meta-information recording area may be secured on the recording medium upon starting the stream data recording so that, each time element information of meta-information is got in each of steps S105, S108, S109, and S112, the got element information is output to the recording control unit 17 and written into the meta-information recording area.

<PCR Reset Detection Method>

The three methods of judging whether or not PCR reset occurred in an invalid section in step S110 in FIG. 8 are described in detail below.

The method of using a time offset value is described first.

Figure 9:
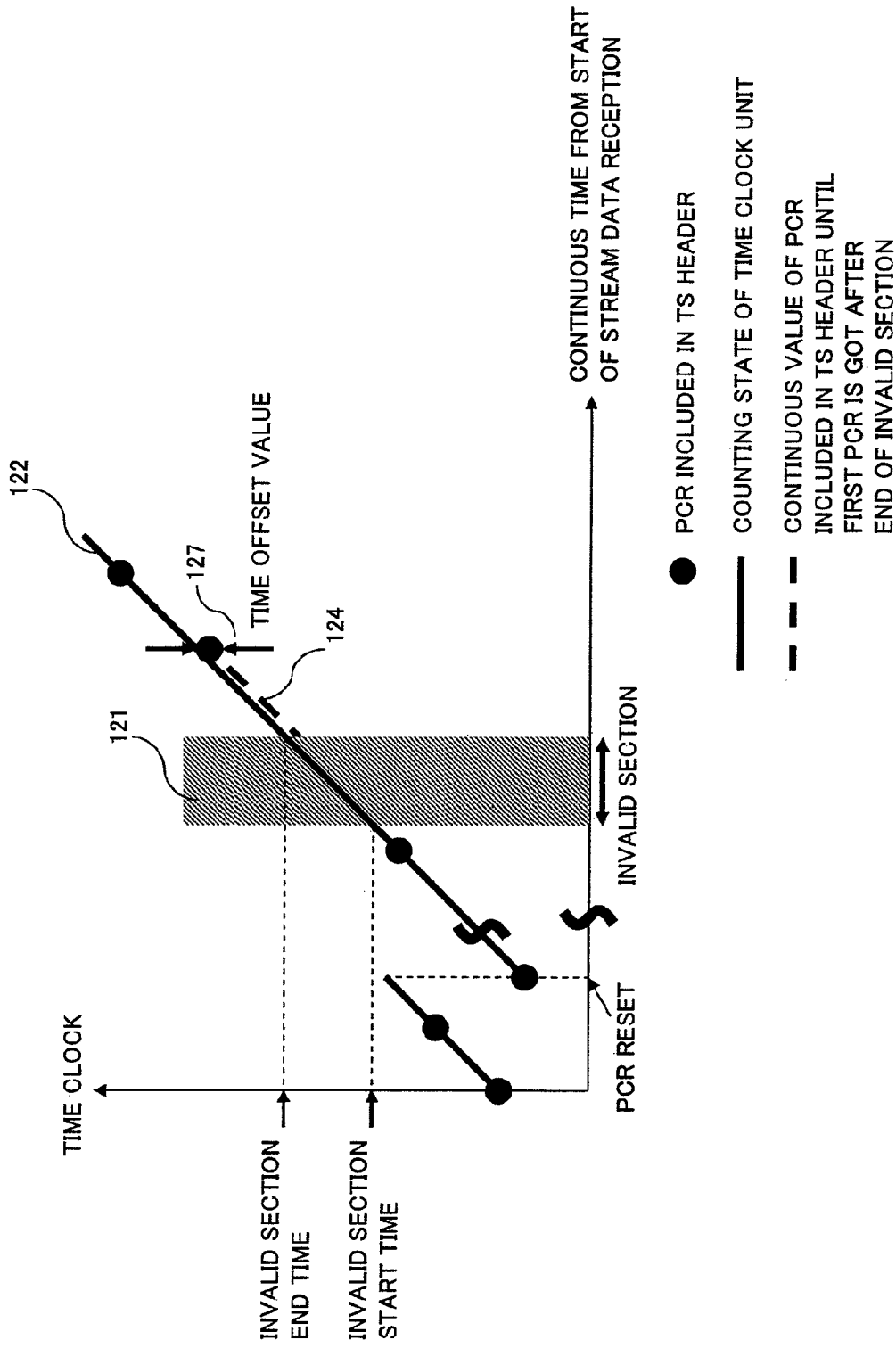
FIG. 9 shows a relation between a STC value and a PCR when PCR reset does not occur in an invalid section.

FIG. 9 shows a change in STC value with time, when no PCR reset occurred in an invalid section. In FIG. 9, a horizontal axis shows a continuous time from the beginning of stream data that is broadcast, and a vertical axis shows a STC value. A diagonally shaded area 121 shows an invalid section in the stream data. A black circle shows PCR time information included in a TS header. A straight line 122 shows a state of counting by the time clock unit 14. A broken line 124 shows a continuous value of a PCR included in a TS header until PCR information is first got after the invalid section ends. A time offset value 127 shows a difference between the straight line 122 and the broken line 124.

A case where PCR reset occurred in the invalid section is explained below, with reference to FIG. 1. Originally, if the time clock counts based on the PCR included in the TS header, the counting state is as shown by the broken line 104 in FIG. 1, creating a difference, i.e. the time offset value 113, from the STC value of the time clock unit 14 shown by the straight line 102. On the other hand, in a case where no PCR reset occurred in the invalid section, the counting state of the time clock based on the PCR included in the TS header is as shown in the broken line 124, creating no difference from the STC value of the time clock unit 14 shown by the straight line 122. Which is to say, if PCR reset occurred in the invalid section, the time offset value is large (113 in FIG. 1), and if no PCR reset occurred in the invalid section, the time offset value is small (127 in FIG. 9).

Figure 10:
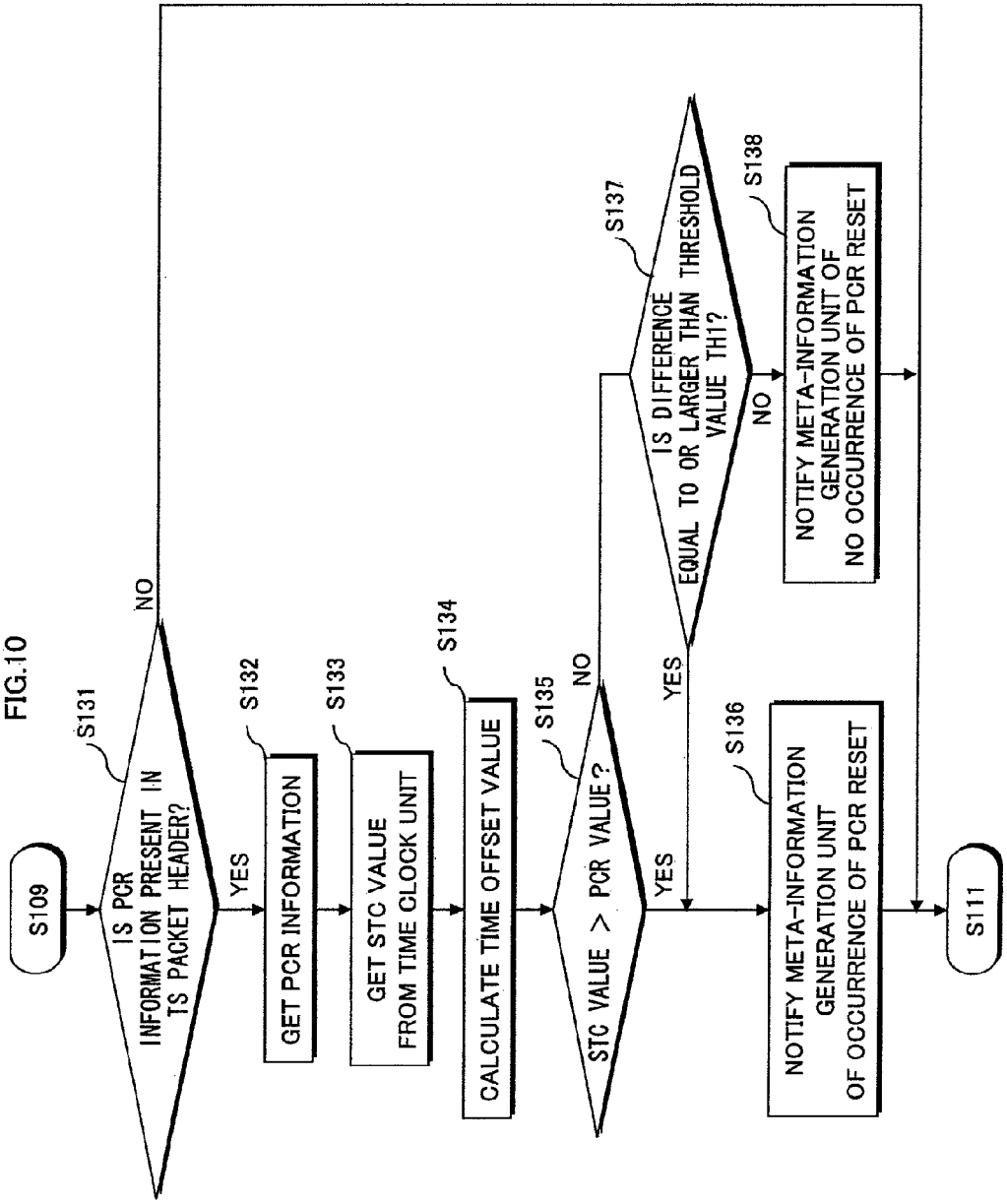
FIG. 10 is a flowchart of a process of detecting PCR reset using a time offset value.

A PCR reset detection process which utilizes this feature that a time offset value is caused by PCR reset in an invalid section is described below, with reference to FIG. 10. FIG. 10 is a flowchart of a process of detecting PCR reset using a time offset value.

The packet analysis unit 12 analyzes a header of an got TS packet, and checks whether or not PCR information is included in the header (step S131). If no PCR information is included (step S131: NO), the procedure of the PCR reset detection process shown in this flowchart ends. If PCR information is included in the header (step S131: YES), the packet analysis unit 12 notifies the reset detection unit 15 of the presence of the PCR information via the time clock unit 14, and the reset detection unit 15 gets the PCR information (step S132). Also, the reset detection unit 15 gets a STC value before being synchronized with the PCR information, from the time clock unit 14 (step S133). The reset detection unit 15 compares the STC value of the time clock unit 14 with the PCR value, and calculates a time offset value (step S134).

If the STC value is larger than the PCR value (step S135: YES), the reset detection unit 15 judges that PCR reset occurred, and notifies the meta-information generation unit 16 of the calculated time offset value (step S136). If the STC value is no larger than the PCR value (step S135: NO), the reset detection unit 15 judges whether or not the time offset value is no smaller than a threshold value TH1. If the time offset value is no smaller than the threshold value TH1 (step S137: YES), the reset detection unit 15 judges that PCR reset occurred, and notifies the meta-information generation unit 16 of the calculated time offset value (step S136).

If the STC value is no larger than the PCR value and also the time offset value is smaller than the threshold value TH1 (step S135: NO, step S137: NO), the reset detection unit 15 judges that no PCR reset occurred, notifies the meta-information generation unit 16 of "0" as a time offset value (step S138), and ends the procedure of the PCR reset detection process shown in this flowchart.

This completes the description of the procedure of the PCR reset detection process which utilizes the feature that a time offset value occurs as a result of missing of PCR reset. According to the above procedure, it is possible to detect not only a simple case where PCR reset occurs in an invalid section, but also a phenomenon in which, when a PMT in an invalid section indicates to change a PID of a TS packet including PCR information, the change of the PID is unable to be made due to missing of this PMT and as a result a difference emerges between the STC value and the PCR value.

Though the judgment of step S135 uses a judgment condition "whether or not the STC value is larger than the PCR value", the judgment of step S135 may instead use a judgment condition "whether or not a sum of the STC value and the PCR information transmission cycle is larger than the PCR value".

Figure 11:
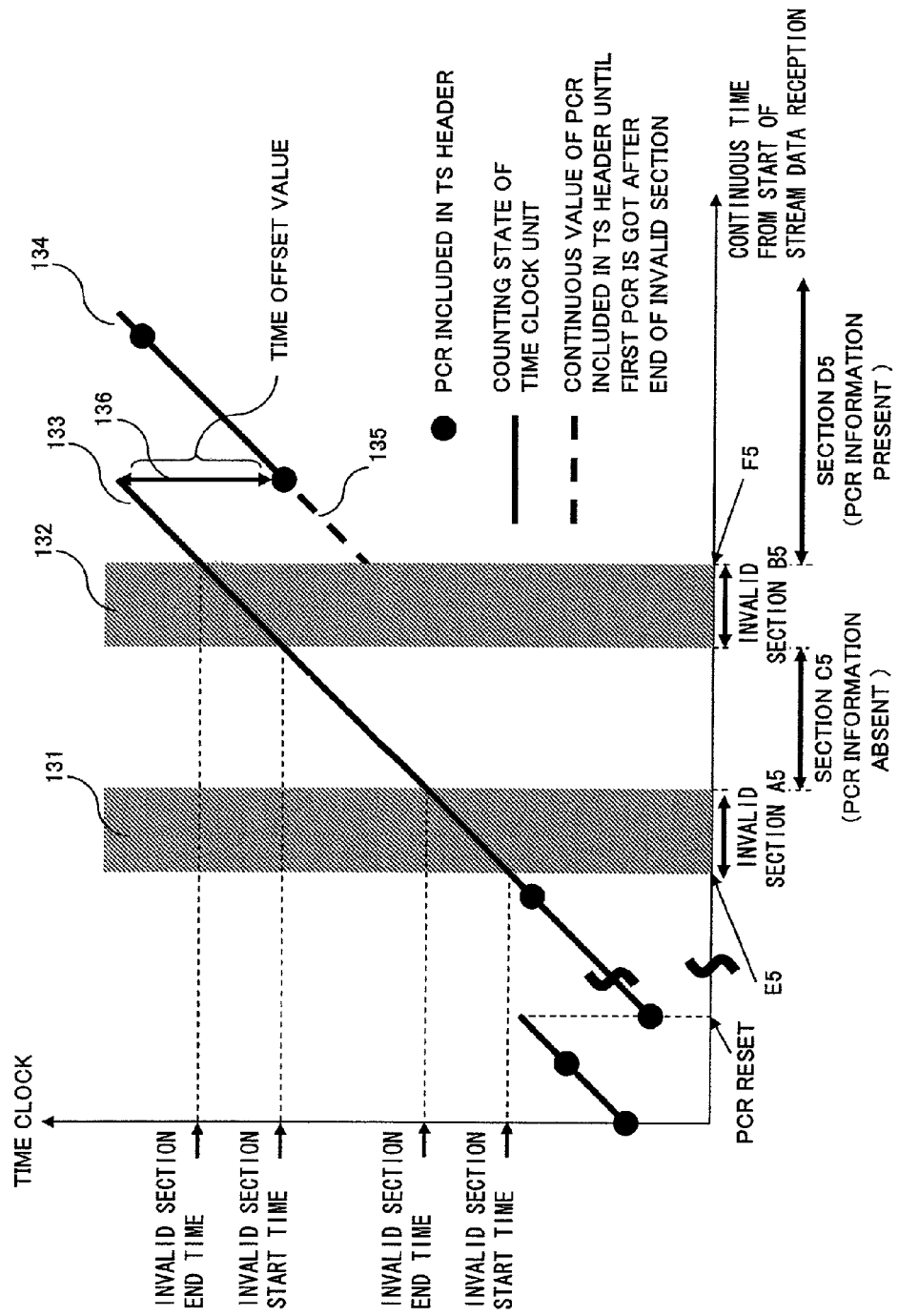
FIG. 11 shows a relation between a STC value and a PCR when a plurality of invalid sections occur.

The following describes how to deal with a case when a plurality of invalid sections occur in a short period of time. FIG. 11 shows a relation between the STC value and the PCR when a plurality of invalid sections occur. In FIG. 11, a horizontal axis shows a continuous time from when the stream data reception starts, and a vertical axis shows the STC value. A diagonally shaded area 131 and a diagonally shaded area 132 respectively show an invalid section A5 and an invalid section B5 in which the radio wave reception condition deteriorates and a TS packet to be recorded is missing. A black circle shows PCR time information included in a TS header. Straight lines 133 and 134 show a counting state of the time clock unit 14. A broken line 135 shows a continuous PCR value included in a TS header until PCR information is first got after the invalid section B5 ends. A time offset value 136 shows a difference between the straight line 133 and the broken line 135. A point E5 is a start point of the invalid section A5, whilst a point F5 is an end point of the invalid section B5. A section C5 shows a section in which stream data between the invalid sections A5 and B5 is properly received. No PCR information is included in the stream data of the section C5. A section D5 shows a section in which stream data is properly received after the invalid section B5. A PCR is included in the stream data of the section D5.

In a situation where no PCR information is present between the end of the invalid section and the next invalid section (as in the case of the section C5 in FIG. 11), the operation exits from the procedure of FIG. 10 at step S131. This makes it impossible to calculate a time offset value, so that the judgment as to whether PCR reset occurred in the invalid section A5 in FIG. 11 cannot be performed. This being so, the section C5 in FIG. 11 cannot be reproduced with a timing intended by the broadcasting system.

In view of this, if no PCR information is present until the next invalid section, the invalid section A5 and the invalid section B5 in FIG. 11 are combined to treat a section from E5 to F5 as one invalid section, and meta-information is generated for this combined invalid section.

This process can be realized in the following manner. In the procedure shown in FIG. 8, the meta-information generation unit 16 does not perform step S105 for the succeeding invalid section (the invalid section B5 in FIG. 11) and, in steps S108 and S109 for the succeeding invalid section (the invalid section B5 in FIG. 11), rewrites a "missing end time" and "discontinuity point index information" of meta-information corresponding to the invalid section (the invalid section A5 in FIG. 11) whose time offset value cannot be calculated, to a "missing end time" and "discontinuity point index information" corresponding to the succeeding invalid section (the invalid section B5 in FIG. 11).

The second method of judging whether or not PCR reset occurred in an invalid section, which uses time information from reception to output of video data, is described below.

To prevent a buffer overflow or a buffer underflow, a buffer size, a data holding time in a buffer, and the like are prescribed as a virtual model in a standard. As one example, the "Operational Guidelines for Digital Terrestrial Television Broadcasting" stipulated by the Association of Radio Industries and Businesses (ARIB TR B-14) specify that stream data input in a CPB (Coded Picture Buffer) for holding video stream data is decoded and output within 1.5 second. The CPB is a buffer of a virtual model defined by ISO/IEC 14496-10 MPEG4 AVC.

Figure 12:
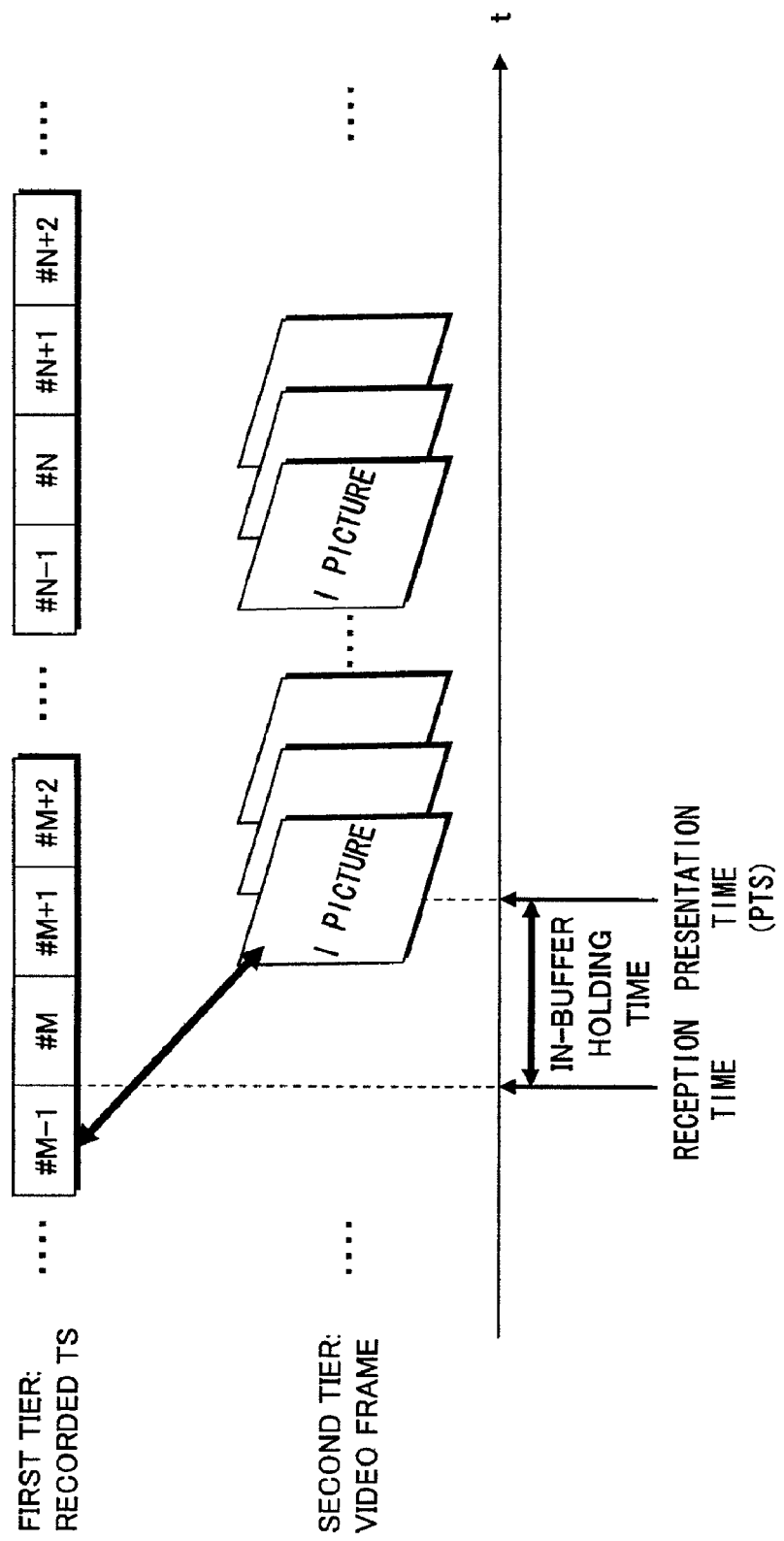
FIG. 12 shows a relation between a TS and video frames.

FIG. 12 shows a relation between a TS and video frames. The first tier shows a recorded TS, and the second tier shows video frames obtained by decoding video data included in the TS. An in-buffer holding time shows a time period from when TS data is received to when video data is decoded and output. For example, in the case of the "Operational Guidelines for Digital Terrestrial Television Broadcasting", the data holding time of the CPB is within 1.5 second, and so the in-buffer holding time can be estimated to be within $(1.5+\alpha)$ second. Here, $\alpha$ is a time period from when TS data is received to when a decoding process is started, and is dependent on the stream data recording device. If no PCR reset occurred in an invalid section, a difference between a PTS included in a PES header and a time point (STC value) of receiving TS data is within this in-buffer holding time. If PCR reset occurred in an invalid section, on the other hand, the difference exceeds the in-buffer holding time.

Figure 13:
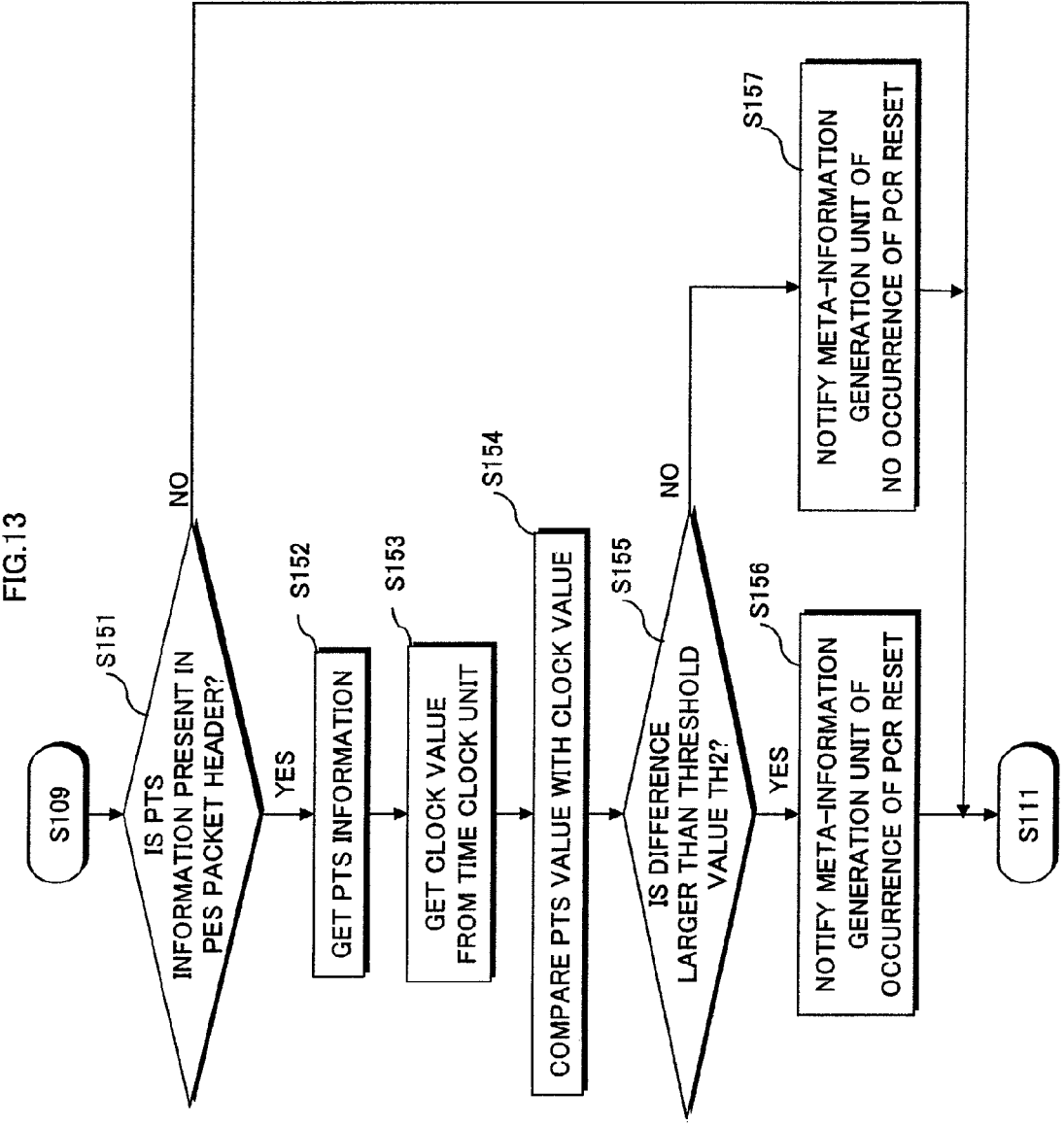
FIG. 13 is a flowchart of a process of detecting PCR reset using an in-buffer holding time.

A PCR reset detection process which utilizes this feature that a difference between a STC value at the time of receiving TS data and a PTS included in a PES header exceeds an in-buffer holding time due to PCR reset in an invalid section is described below, with reference to FIG. 13. FIG. 13 is a flowchart of a process of detecting PCR reset by using an in-buffer holding time.

The packet analysis unit 12 analyzes a payload part of an got TS packet, and checks whether or not a PTS is included in a PES header (step S151). If the PTS is not included (step S151: NO), the procedure of the PCR reset detection process shown in this flowchart ends. If the PTS is included (step S151: YES), the packet analysis unit 12 notifies the presence of the PTS to the reset detection unit 15, and the reset detection unit 15 responsively gets the PTS (step S152). Also, the reset detection unit 15 gets a STC value at that time from the time clock unit 14 (step S153). The reset detection unit 15 compares the PTS and the STC value got from the time clock unit 14, and calculates an in-buffer holding time of a frame to which the PTS is given (step S154).

When the calculated in-buffer holding time is larger than a threshold value TH2 that is based on a data holding time of a buffer specified in a digital broadcasting standard (step S155: YES), the reset detection unit 15 judges that PCR reset occurred, and notifies the meta-information generation unit 16 of the occurrence of the PCR reset (step S156). Here, though not shown in FIG. 13, the reset detection unit 15 performs steps S131-S134 in FIG. 10 to calculate a time offset value, and notifies the time offset value to the meta-information generation unit 16. When the in-buffer holding time is no larger than the threshold value TH2 (step S155: NO), the reset detection unit 15 judges that no PCR reset occurred, notifies the meta-information generation unit 16 of "0" as a time offset value (step S157), and ends the procedure of the PCR reset detection process shown in this flowchart.

According to this second method, the detection as to whether PCR reset occurred in an invalid section is performed by using a PTS included in stream data that follows the invalid section. This makes it possible to detect an occurrence of PCR reset even in the case where no PCR information is included between the end of one invalid section to the start of the next invalid section as in the case of the section C5 in FIG. 11. If no PCR reset occurred, the section C5 can be reproduced with a timing intended by the broadcasting system. If PCR reset occurred, since a time offset value in the section C5 in FIG. 11 cannot be calculated, the invalid section A5 and the invalid section B5 in FIG. 11 are combined and meta-information for one invalid section from the point E5 to the point F5 is generated, as in the first method.

Though the PCR reset detection method using video data is described above, other components such as audio data may be used instead of video data.

The third method of judging whether or not PCR reset occurred in an invalid section is described below. This method deals with a case when, in the second method, no PCR information is included in a section in which stream data is properly received.

In FIG. 11, the PCR reset detection method for the invalid section A5 is similar to the second method whose procedure is shown in FIG. 13. The difference from the second method is the following. In step S154 in FIG. 13, the value of comparison between the PTS value and the STC value is held as an in-buffer holding time of the invalid section A5. Also, in step S156, if no time offset value is calculated, the meta-information generation unit 16 sets a value indicating that the time offset value cannot be calculated yet (e.g. "−1"), as a "time offset value" of meta-information corresponding to the invalid section A5.

The PCR reset detection method for the invalid section B5 is described below, with reference to a drawing.

Figure 14:
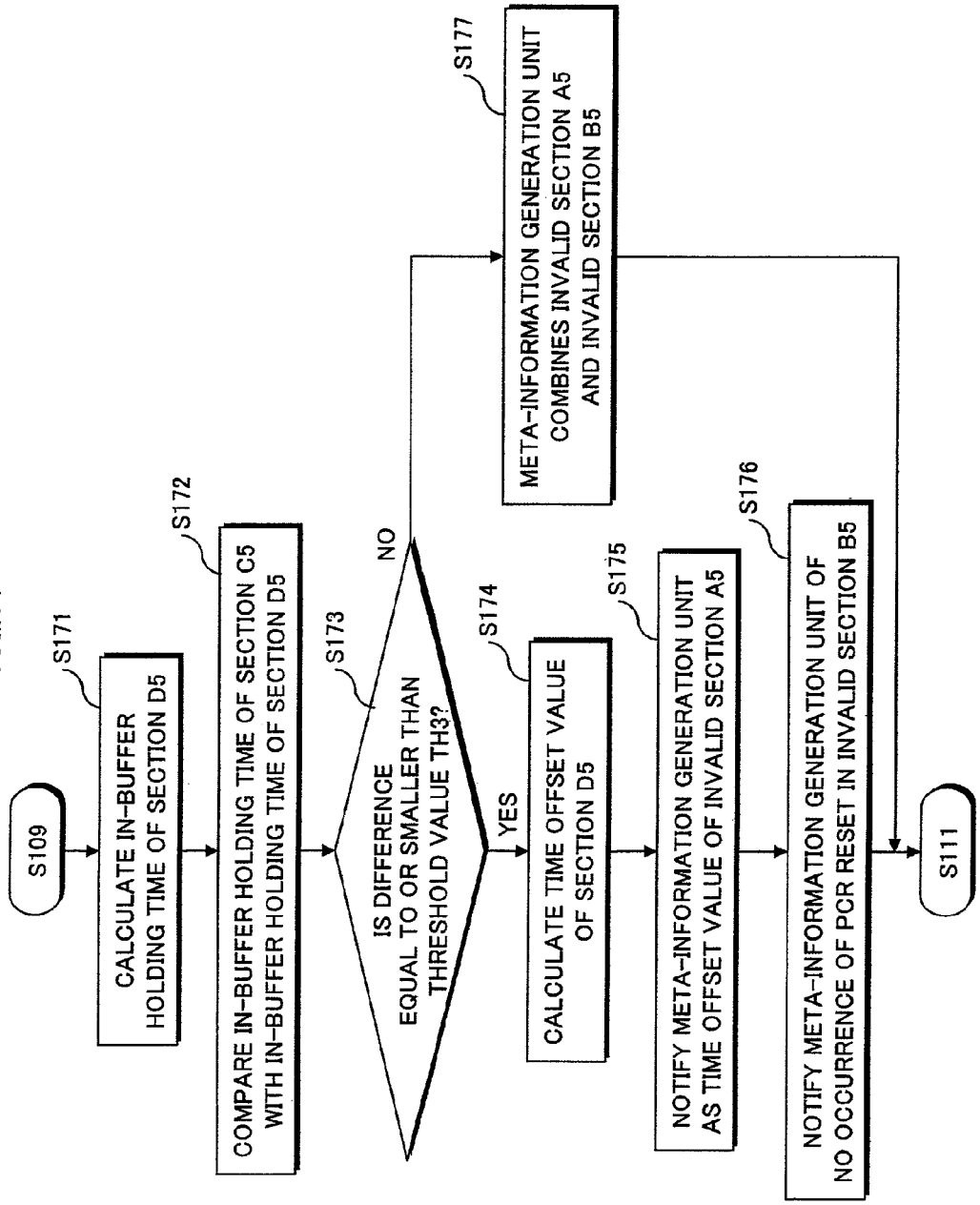
FIG. 14 is a flowchart showing a method of detecting PCR reset in an invalid section that occurs after an invalid section in which PCR reset occurs but a time offset value cannot be calculated.

FIG. 14 is a flowchart showing a method of detecting PCR reset for an invalid section that occurs after an invalid section in which PCR reset occurred but a time offset value could not be calculated. The invalid sections A5 and B5 and the sections C5 and D5 in the flowchart of FIG. 14 correspond to those shown in FIG. 11.

In the procedure shown in FIG. 14, an in-buffer holding time of the section D5 is calculated first (step S171). This can be done according to the same procedure as steps S151-S154 in FIG. 13. After this, a difference from a held in-buffer holding time of the section C5 is calculated (step S172). If this difference is no larger than a threshold value TH3 (step S173: YES), a time offset value of the section D5 is calculated (step S174). In this case, it can be judged that a time offset value of the section C5 and the time offset value of the section D5 are the same. This being so, the reset detection unit 15 notifies the meta-information generation unit 16 of this time offset value as a time offset value of the invalid section A5 (step S175). Also, the reset detection unit 15 notifies the meta-information generation unit 16 of "0" as a time offset value of the invalid section B5, on the ground that no PCR reset occurred in the invalid section B5.

In the judgment of step S173, if the difference in in-buffer holding time between the section C5 and the section D5 is larger than the threshold value TH3 (step S173: NO), it means PCR reset occurred in both the invalid section A5 and the invalid section B5. In such a case, it is impossible to calculate a time offset value of the section C5, so that the meta-information generation unit 16 performs a process of combining the invalid section A5 and the invalid section B5 (step S177).

The selection as to whether the process of FIG. 13 or the process of FIG. 14 is executed as the PCR reset detection method can be made by holding an identification flag in the reset detection unit 15. For instance, the flag is set to ON if a start of a next invalid section is detected while a time offset value is unable to be calculated, and set to OFF in step S173 in FIG. 14. This flag is referenced when starting the PCR reset detection process. If the flag is ON, the process of FIG. 14 is executed. If the flag is OFF, the process of FIG. 13 is executed.

This completes the description of the stream data recording device 5 that achieves the stream data recording function in the mobile reception terminal 3.

<Stream Data Reproducing Device>

The following describes a construction of reproducing recorded stream data in the mobile reception terminal 3, in detail.

Figure 15:
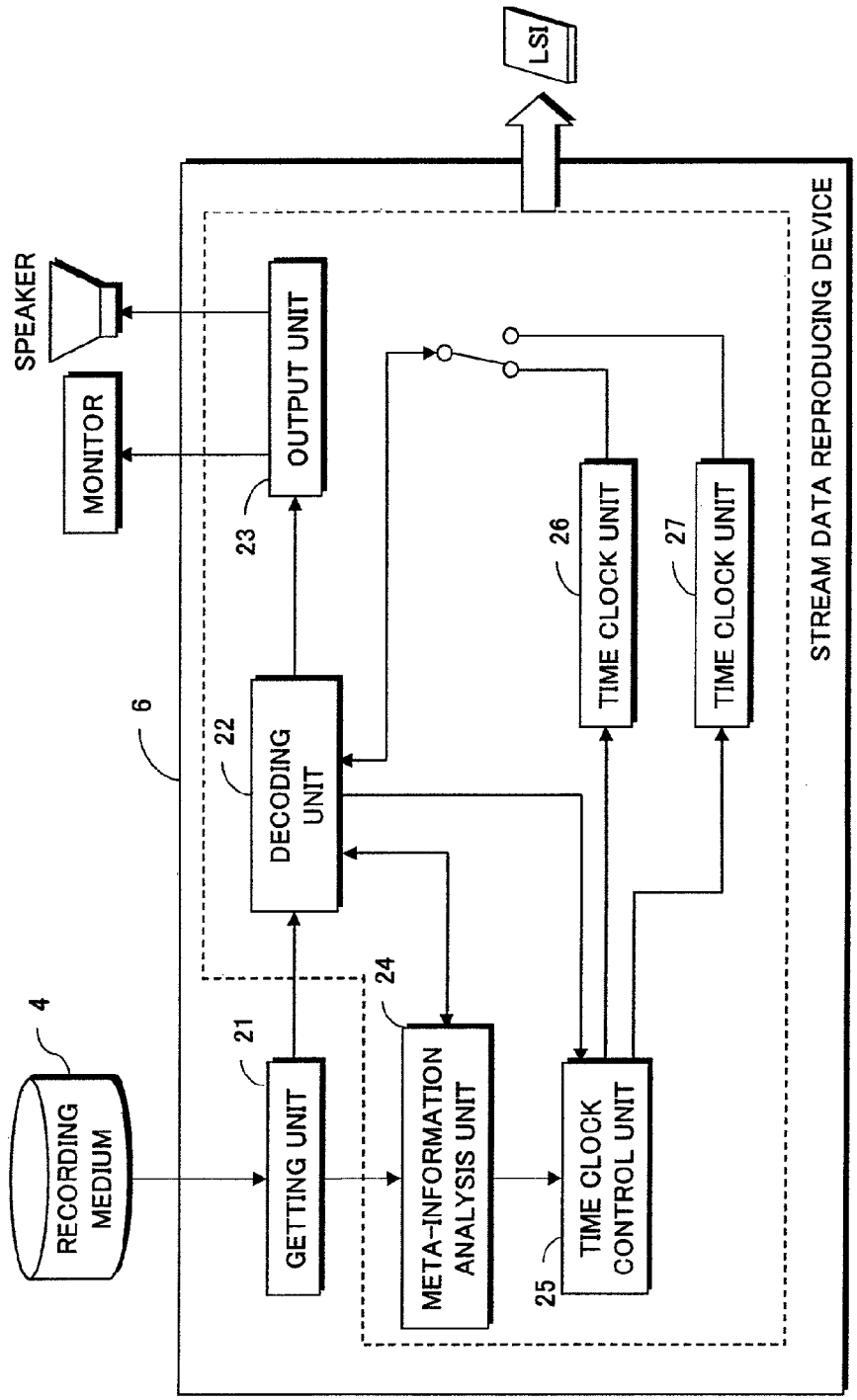
FIG. 15 shows an internal construction of a stream data reproducing device 6 according to the embodiment.

A stream data reproducing function is realized by a stream data reproducing device 6 included in the mobile reception terminal 3. FIG. 15 shows an internal construction of the stream data reproducing device 6 according to this embodiment.

In FIG. 15, stream data and meta-information recorded by the stream data recording device 5 are held on the recording medium 4.

As shown in FIG. 15, the stream data reproducing device 6 includes a getting unit 21, a decoding unit 22, an output unit 23, a meta-information analysis unit 24, a time clock control unit 25, a time clock unit 26, and a time clock unit 27.

The getting unit 21, based on an instruction from the user, gets meta-information and stream data from the recording medium 4, and outputs the stream data to the decoding unit 22 and the meta-information to the meta-information analysis unit 24.

The decoding unit 22 gets the stream data from the getting unit 21, and performs a decoding process on the got stream data to generate video data, audio data, subtitle data, or the like. The decoding unit 22 then references one of the time clock unit 26 and the time clock unit 27, and outputs decoded data of each component, such as audio or video, to the output unit 23 with a timing at which a PTS of the component matches a STC value of the reference target. The STC value reference target is switched between the time clock unit 26 and the time clock unit 27, when a reproducing process reaches a stream data position notified by the meta-information analysis unit 24. Also, when PCR information is got from the stream data, the decoding unit 22 notifies the time clock control unit 25 of a PCR value.

The output unit 23 outputs a video signal and an audio signal got from the decoding unit 22, to a display, a speaker, and the like.

The meta-information analysis unit 24 analyzes the meta-information got from the getting unit 21, and notifies the time clock control unit 25 of a "time offset value" and a "missing end time", in order to reset a STC value. Also, the meta-information analysis unit 24 notifies the decoding unit 22 of a stream data position at which the reference target time clock is to be switched, based on "discontinuity point index information" of the meta-information.

The time clock control unit 25 synchronizes one of the time clock unit 26 and the time clock unit 27 that is referenced by the decoding unit 22, with the PCR value notified from the decoding unit 22. The time clock control unit 25 also resets one of the time clock unit 26 and the time clock unit 27 that is not referenced by the decoding unit 22, using the time offset value got from the meta-information analysis unit 24. The reset of the time clock using the time offset value is performed with a timing at which the STC value of the time clock referenced by the decoding unit 22 reaches the "missing end time" of the meta-information.

The time clock unit 26 and the time clock unit 27 each serve as a clock that is referenced by the decoding unit 22 in order to output the video signal, the audio signal, and the like generated by the decoding unit 22 with an appropriate timing.

This completes the description of the internal construction of the stream data reproducing device 6.

<Time Clock Switching>

The following describes the switching of the time clock whose STC value is referenced by the decoding unit 22.

Figure 16:
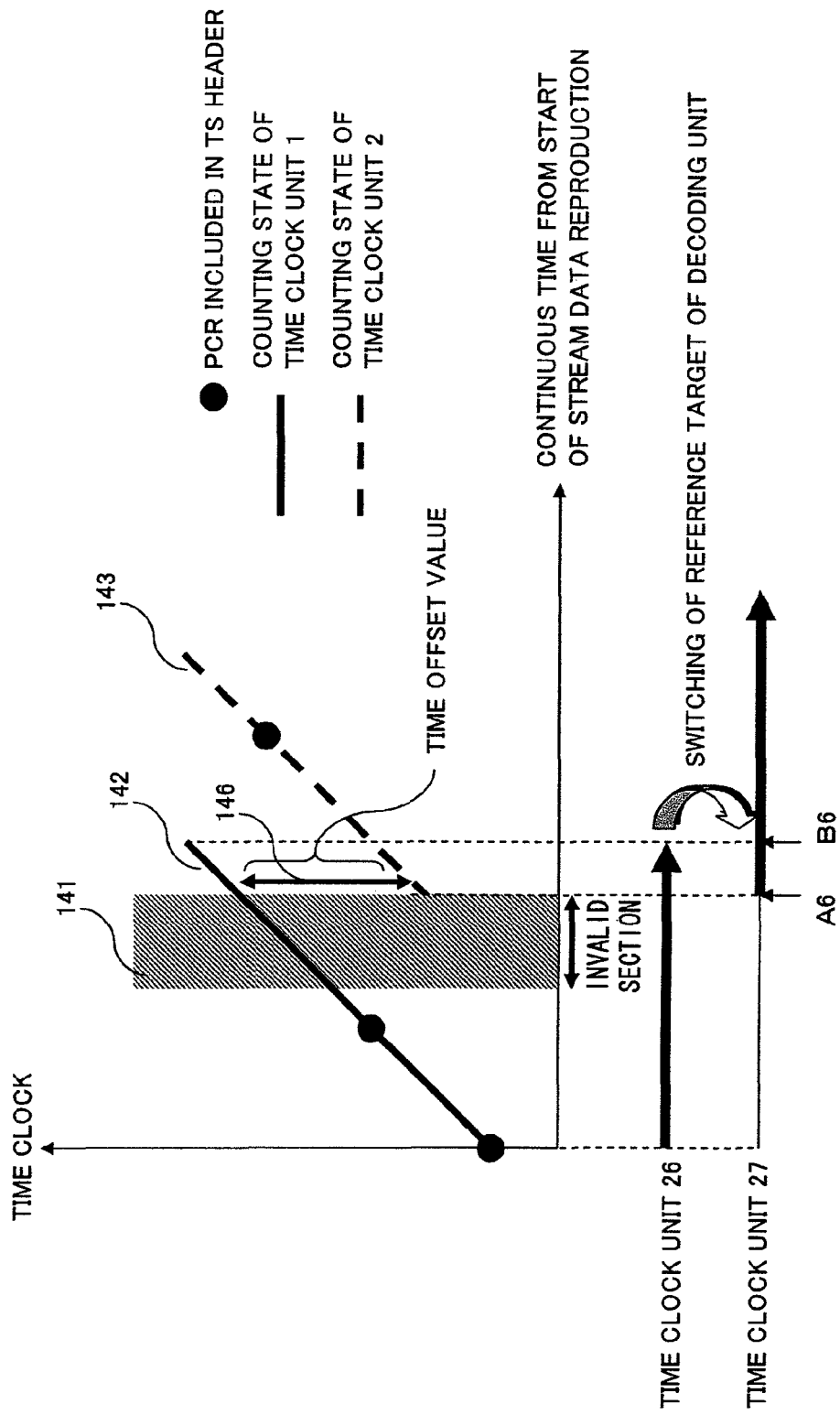
FIG. 16 shows how a time clock unit 26 and a time clock unit 27 change when reproducing stream data in which PCR reset occurs in an invalid section.

FIG. 16 shows a state of change in the time clock unit 26 and the time clock unit 27, when reproducing stream data in which PCR reset occurred in an invalid section. A horizontal axis of a graph shows a continuous time from when the reproduction of the stream data starts. A vertical axis of the graph shows a clock value of a time clock. A diagonally shaded area 141 shows an invalid section. A black circle shows PCR time information included in a TS header. A straight line 142 shows a counting state of the time clock unit 26, and a broken line 143 shows a counting state of the time clock unit 27. A time offset value 146 shows a difference between the time clock unit 26 and the time clock unit 27.

An arrow of each of the time clock units 26 and 27 under the graph indicates a range in which a clock value of the time clock unit takes a valid value. A point A6 shows a timing with which the time clock unit 27 is reset, and a point B6 shows a timing with which the time clock referenced by the decoding unit 22 is switched from the time clock unit 26 to the time clock unit 27.

When PCR reset occurred in an invalid section, it is necessary to resynchronize a time clock in accordance with the reset PCR, after the invalid section ends.

In stream data reproduction, stream data is not reproduced with a timing of being read from a recording medium, as it takes time from when the stream data is read to when it is decoded and output. This being so, there is a case where an output time of stream data read before the occurrence of the invalid section comes after the end of the invalid section. In such a case, since a PTS of the stream data received before the occurrence of the invalid section has been set based on a PCR that precedes the occurrence of the PCR reset, if the time clock is brought into synchronization with a PCR value reset in the invalid section immediately after the end of the invalid section, the correspondence between the PTS and the time clock is lost. In view of this, the two time clocks are provided, where the time clock unit 27 is synchronized with the PCR value reset in the invalid section with a timing of the end of the invalid section (A6 in FIG. 16), but the reference target of the decoding unit 22 is switched to the time clock unit 27 after the output of all stream data received before the occurrence of the invalid section is completed (B6 in FIG. 16).

<Stream Data Reproducing Method>

Figure 17:
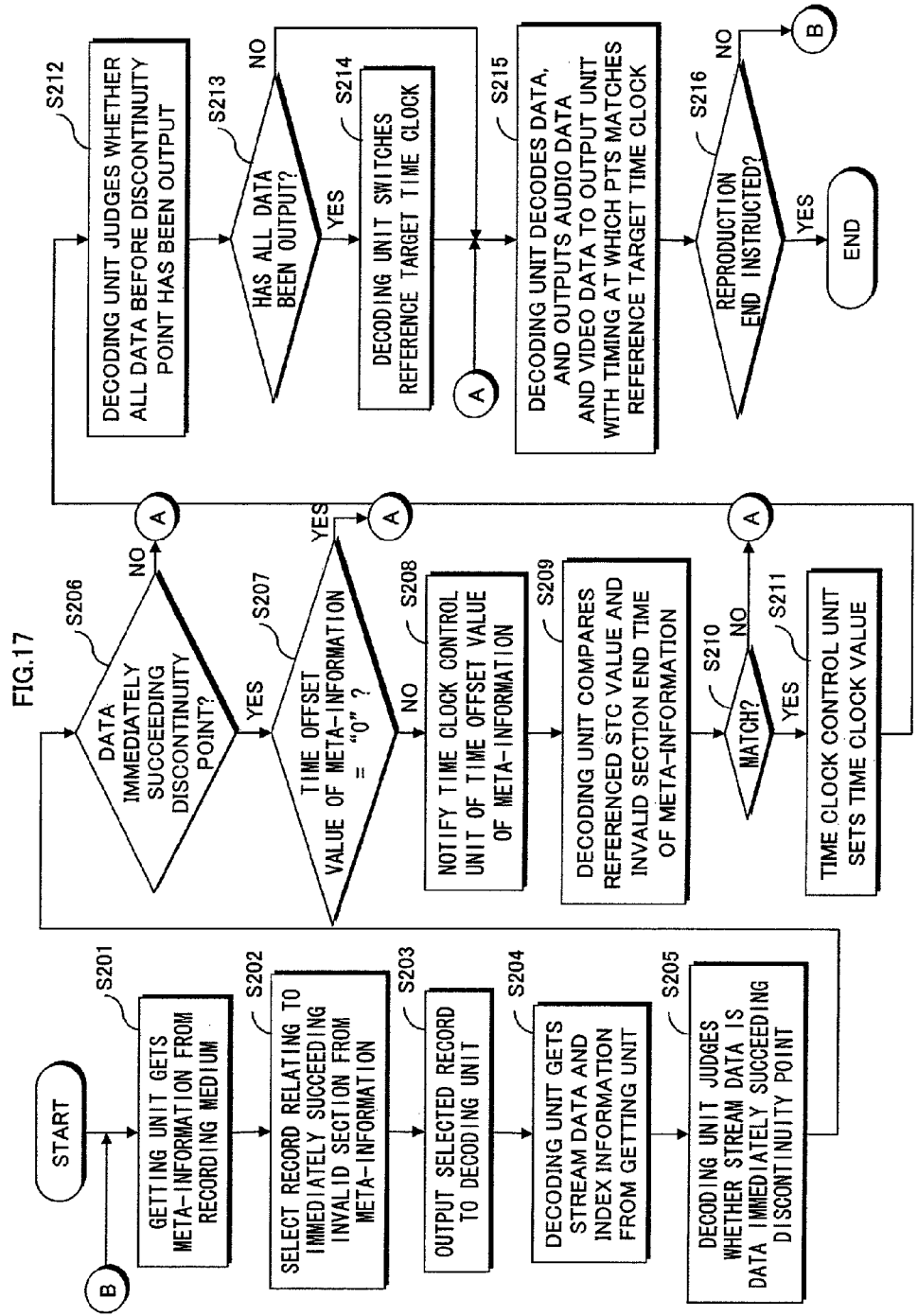
FIG. 17 shows a procedure of a stream data reproducing process in the stream data reproducing device 6 according to the embodiment.

The following describes an operational procedure of the stream data reproducing device 6 getting stream data from the recording medium 4 and reproducing the stream data. FIG. 17 shows a procedure of a stream data reproducing process in the stream data reproducing device 6 according to this embodiment.

When a reproducing process is launched in accordance with an instruction from the user, the getting unit 21 reads meta-information from the recording medium 4 and outputs the meta-information to the meta-information analysis unit 24 (step S201). The meta-information analysis unit 24 selects, among records registered in the meta-information, a record whose "discontinuity point index information" relates to a nearest invalid section after a current stream data reproduction position (step S202), and outputs the selected record to the decoding unit 22 (step S203).

The decoding unit 22 receives reproduction target stream data read from the recording medium 4 by the getting unit 21 and index information of the got part relative to a file beginning (step S204), and compares the index information from the file beginning with the "discontinuity point index information" of the meta-information got from the meta-information analysis unit 24, to judge whether or not the stream data to be processed for reproduction is discontinuous from the preceding data (step S205).

If the stream data to be processed is not discontinuous from the preceding data (step S206: NO), the decoding unit 22 performs a decoding process to generate video data, audio data, and subtitle data. After this, the decoding unit 22 outputs decoded data of each component to the output unit 23, with a timing at which a PTS of the component matches the referenced time clock (step S215).

If the stream data to be processed is discontinuous from the preceding data (step S206: YES), the decoding unit 22 references a "time offset value" of the meta-information. When the referenced time offset value is "0" (step S207: YES), no PCR reset occurred in the invalid section and so it is unnecessary to reset the time clock. Accordingly, step S215 is executed to reproduce and output the stream data.

When the referenced time offset value is not "0" (step S207: NO), PCR reset occurred in the invalid section and so it is necessary to reset the time clock value. Accordingly, the decoding unit 22 notifies the meta-information analysis unit 24 that the stream data to be processed reaches the position that is discontinuous from the preceding data. Upon being notified, the meta-information analysis unit 24 notifies the time clock control unit 25 of the "time offset value" of the record selected in step S202 (step S208).

Following the discontinuity point position reach notification to the meta-information analysis unit 24, the decoding unit 22 compares the clock value of the currently referenced time clock unit with a "missing end time" of the meta-information (step S209). If they do not match (step S210: NO), it means the current time is still a timing of processing data preceding the discontinuity point, so that step S215 is executed to reproduce and output the data preceding the discontinuity point.

If the missing end time matches the clock value of the time clock unit (step S210: YES), the decoding unit 22 notifies the time clock control unit 25 which of the time clock unit 26 and the time clock unit 27 the decoding unit 22 currently references. Upon being notified, the time clock control unit 25 sets the time clock not referenced by the decoding unit 22, to a value obtained by subtracting the "time offset value" notified in step S208 from the clock value of the other time clock (step S211).

Next, the decoding unit 22 executes steps S212 to S214, to switch the referenced time clock unit. In this process, the decoding unit 22 firstly judges whether or not all data preceding the "discontinuity point index information" of the meta-information has been output (step S212). For example, in the case where a discontinuous packet has been inserted in the reproduction target stream data by the missing detection unit 13 in the stream data recording device 5 at the time of recording, this judgment can be made by judging, when outputting data generated as a result of a decoding process to the output unit 23, whether or not the processing has been performed up to the discontinuous packet. In the case where the reproduction target stream data does not have a discontinuous packet inserted therein at the time of recording, the decoding unit 22 may insert data indicating discontinuity at a discontinuous stream data position upon getting the stream data from the getting unit 21. As a result, when outputting data generated as a result of the decoding process to the output unit 23, the decoding unit 2 can judge whether or not the processing has been performed up to the data indicating discontinuity.

If the data preceding the discontinuity point still remains (step S213: NO), step S215 is executed without switching the referenced time clock unit, in order to reproduce and output the data preceding the discontinuity point. If the processing of all of the data preceding the discontinuity point is completed (step S213: YES), the decoding unit 22 switches the referenced time clock unit (step S214). After this, step S215 is executed to reproduce and output the data succeeding the discontinuity point. This process of switching the time clock unit is performed using the time clock unit 26 and the time clock unit 27 alternately.

The output unit 23 judges whether or not a reproduction stop instruction is issued by the user, and whether or not the reproducing process reaches the end of the file (step S216). When there is a reproduction stop instruction, the reproducing process ends. When there is no reproduction stop instruction, the procedure returns to step S201 to process the next data.

This completes the description of the operational procedure of the stream data reproducing device 6.

According to the above embodiment, when recording stream data in a poor radio wave reception condition, an offset value between a PCR and a time clock in the stream data recording device is calculated and held as meta-information. When reproducing the recorded stream data, a time clock in the stream data reproducing device is corrected based on the offset value. As a result, the stream data can be reproduced with a timing intended by the broadcasting system.

Second Embodiment

A second embodiment of the present invention is described below.

<Meta-Information>

The following describes meta-information according to the second embodiment. In the meta-information according to the first embodiment, the start and end of an invalid section are recorded using a STC value. In the meta-information according to the second embodiment, on the other hand, the start and end of an invalid section are recorded using a PTS assigned to a component that constitutes a program. The component used here is any of video, audio, subtitles, and the like. This embodiment describes meta-information that uses video data, as one example. FIG. 18 shows a data structure of meta-information according to the second embodiment. The meta-information according to this embodiment is made up of a same number of records as invalid sections detected in stream data, where each record is composed of a "missing start point PTS", a "missing end point PTS", "discontinuity point index information", and a "reproduction period".

The "missing start point PTS" is a PTS of a video frame of stream data received before an invalid section occurs.

The "missing end point PTS" is a PTS of a video frame of stream data received after the invalid section ends.

The "discontinuity point index information" is a position of a TS packet including the "missing end point PTS". The data index information may be a serial number starting from a top one of recording target TS packets, an offset value from a file beginning, and the like. In this embodiment, an offset value from a file beginning is used.

The "reproduction period" is a reproduction period of stream data contained in the invalid section, supposing that such stream data can be reproduced. A value obtained by subtracting the "missing start point PTS" from the "missing end point PTS" corresponds to the "reproduction period".

<Stream Data Recording Device>

The following describes a stream data recording device 7 that generates meta-information having the data structure shown in FIG. 18 in a stream data recording process.

Figure 19:
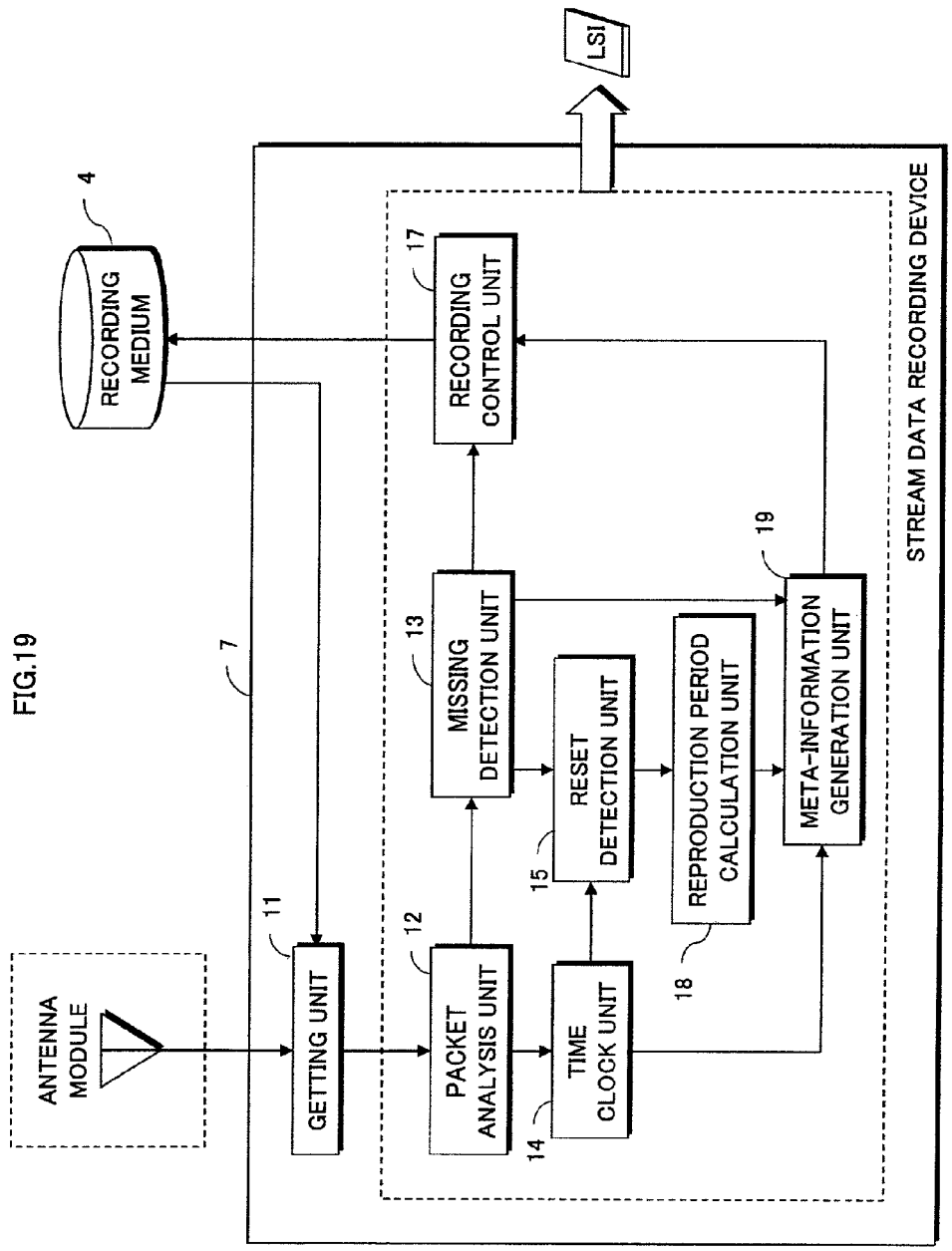
FIG. 19 shows an internal construction of a stream data recording device 7 according to the second embodiment.

FIG. 19 shows an internal construction of the stream data recording device 7 according to the second embodiment. The stream data recording device 7 has a construction in which a reproduction period calculation unit 18 is added to the stream data recording device 5 shown in FIG. 5, and the meta-information generation unit 16 in the stream data recording device 5 is replaced with a meta-information generation unit 19.

Construction elements which are the same as those in the stream data recording device 5 have been given the same reference numerals and their explanation has been omitted here.

The reproduction period calculation unit 18 is a functional block that, when notified of a reset detection result from the reset detection unit 15, calculates a stream data reproduction period corresponding to a section where recording target stream data is missing due to deterioration in radio wave reception condition and the like. The reproduction period calculation unit 18 notifies the meta-information generation unit 19 of the calculated reproduction period.

The meta-information generation unit 19 generates meta-information having the data structure shown in FIG. 18, based on a detection result of the missing detection unit 13 and the reproduction period calculated by the reproduction period calculation unit 18.

This completes the description of the internal construction of the stream data recording device 7.

<Stream Data Recording Method>

Figure 20:
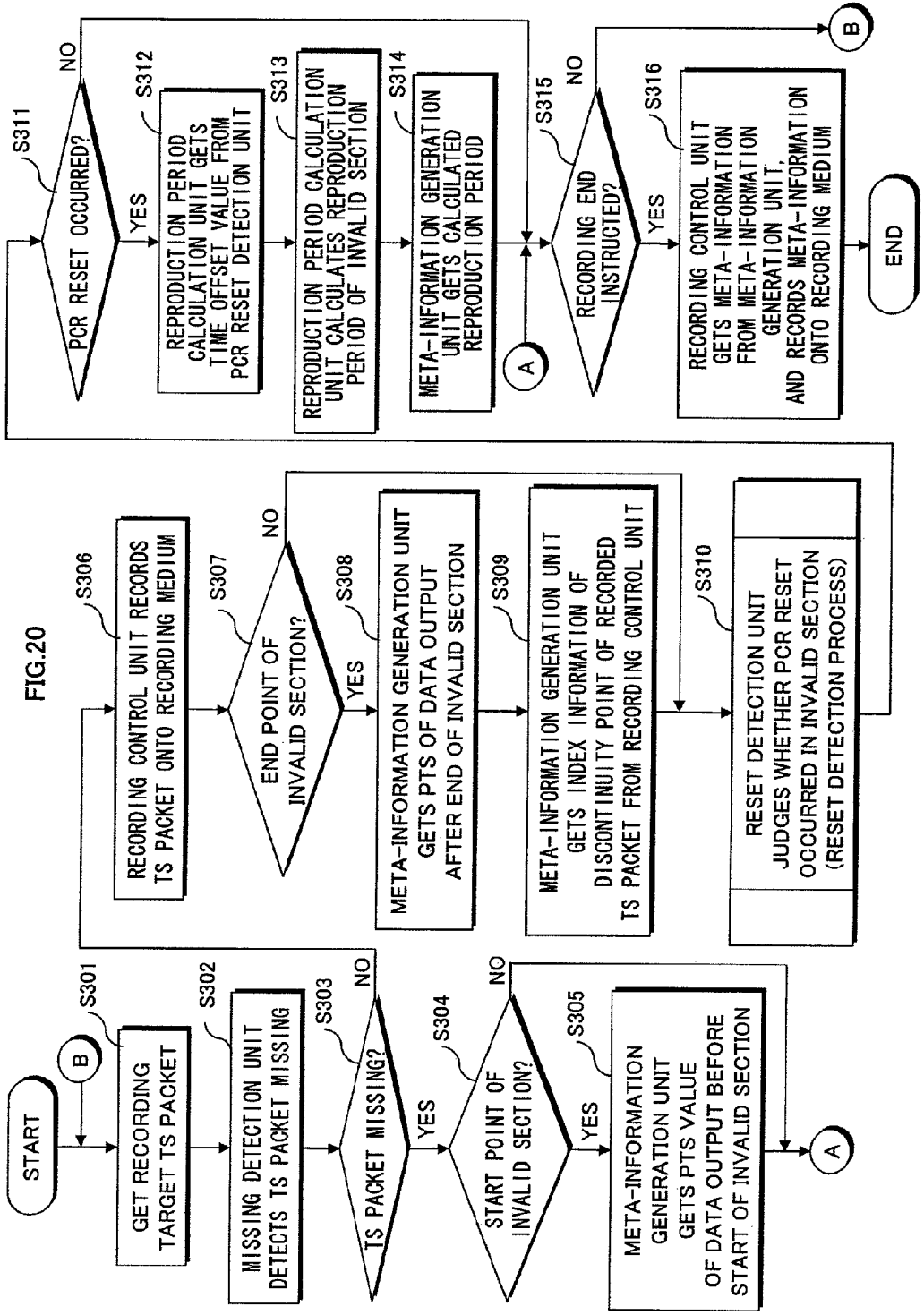
FIG. 20 is a flowchart showing a procedure of a stream data recording process in the stream data recording device 7.

FIG. 20 is a flowchart showing a procedure of a stream data recording process in the stream data recording device 7. The following describes an operational procedure of the stream data recording device 7 with reference to FIG. 20, focusing on the difference from the operational procedure of the stream data recording device 5 shown in FIG. 8.

The procedure shown in FIG. 20 is executed upon receiving a recording instruction from the user, and can be divided into the following four main steps 1-4.

1. Step of detecting an occurrence of an invalid section and getting a missing start point PTS (steps S301-S305).
2. Step of detecting the end of the invalid section and getting a missing end point PTS and discontinuity point index information (steps S306-S309).
3. Step of detecting PCR reset that occurred in the invalid section, and calculating a reproduction period (steps S310-S314).
4. Step of recording generated meta-information (steps S315-S316).

First, steps S301-S305 for detecting an occurrence of an invalid section in stream data to be recorded are described below. The process of steps S301-S305 corresponds to the process of steps S101-S105 in FIG. 8, but a process (step S305) that is executed when the detected TS packet missing is at a start point of the invalid section (steps S304: YES) differs from the process of step S105 in FIG. 8.

In step S305, the missing detection unit 13 notifies the meta-information generation unit 19 of the start of the invalid section. Upon receiving the notification, the meta-information generation unit 19 gets an output time of a video frame output before the occurrence of the invalid section, and holds it as "missing start point PTS" information of meta-information (step S305). For example, this process can be performed in the following manner. Each time the packet analysis unit 12 analyzes a video PES header and detects a PTS included in the PES header, the packet analysis unit 12 outputs the detected PTS to the missing detection unit 13. When detecting the start of an invalid section, the missing detection unit 13 notifies the meta-information generation unit 19 of a last got PTS. This enables the meta-information generation unit 19 to get an output time of a video frame output before the occurrence of the invalid section.

Steps S306-S309 for detecting the end of the invalid section and getting a missing end time and discontinuity point index information are described next. The process of steps S306-S309 corresponds to the process of steps S106-S109 shown in FIG. 8, but a process (step S308) that is executed when the detected TS packet missing is at an endpoint of the invalid section (step S307: YES) differs from the process of step S108 in FIG. 8.

In step S308, the missing detection unit 13 notifies the meta-information generation unit 19 of the end of the invalid section. The meta-information generation unit 19 gets an output time of a video frame output after the end of the invalid section, and holds it as "missing end point PTS" information of the meta-information (step S308). For example, this process can be performed in the following manner. Each time the packet analysis unit 12 analyzes a video PES header and detects a PTS included in the PES header, the packet analysis unit 12 outputs the detected PTS to the missing detection unit 13. After detecting the end of an invalid section, the missing detection unit 13 notifies the meta-information generation unit 19 of a first got PTS. This enables the meta-information generation unit 19 to get an output time of a video frame output after the end of the invalid section.

Steps S310-S314 for detecting PCR reset that occurred in the invalid section and calculating a reproduction period are described next. The process of steps S310-S314 corresponds to the process of steps S110-S112 shown in FIG. 8, but a process (steps S312-S314) that is executed when PCR reset occurred in the invalid section (step S311: YES) differs from the procedure in FIG. 8.

In step S312, the reset detection unit 15 gets a time offset value, and notifies it to the reproduction period calculation unit 18. Upon being notified of the time offset value, the reproduction period calculation unit 18 gets the "missing start point PTS" and the "missing end point PTS" from the meta-information generation unit 19, and calculates a reproduction period corresponding to a video frame included in the invalid section by using the time offset value, the "missing start point PTS", and the "missing end point PTS". The reproduction period calculation process will be described in detail later. In step S314 that follows, the meta-information generation unit 19 gets the reproduction period from the reproduction period calculation unit 18, and holds it as a "reproduction period" of the meta-information.

The process of steps S315 and S316 for recording generated meta-information when the TS recording ends is the same as the process of steps S113 and S114 in FIG. 8.

This completes the description of the operational procedure of the stream data recording device 7.

<Reproduction Period Calculation Method>

The following describes the method of calculating a reproduction period corresponding to stream data included in an invalid section in step S313 in FIG. 20, in detail.

Figure 21:
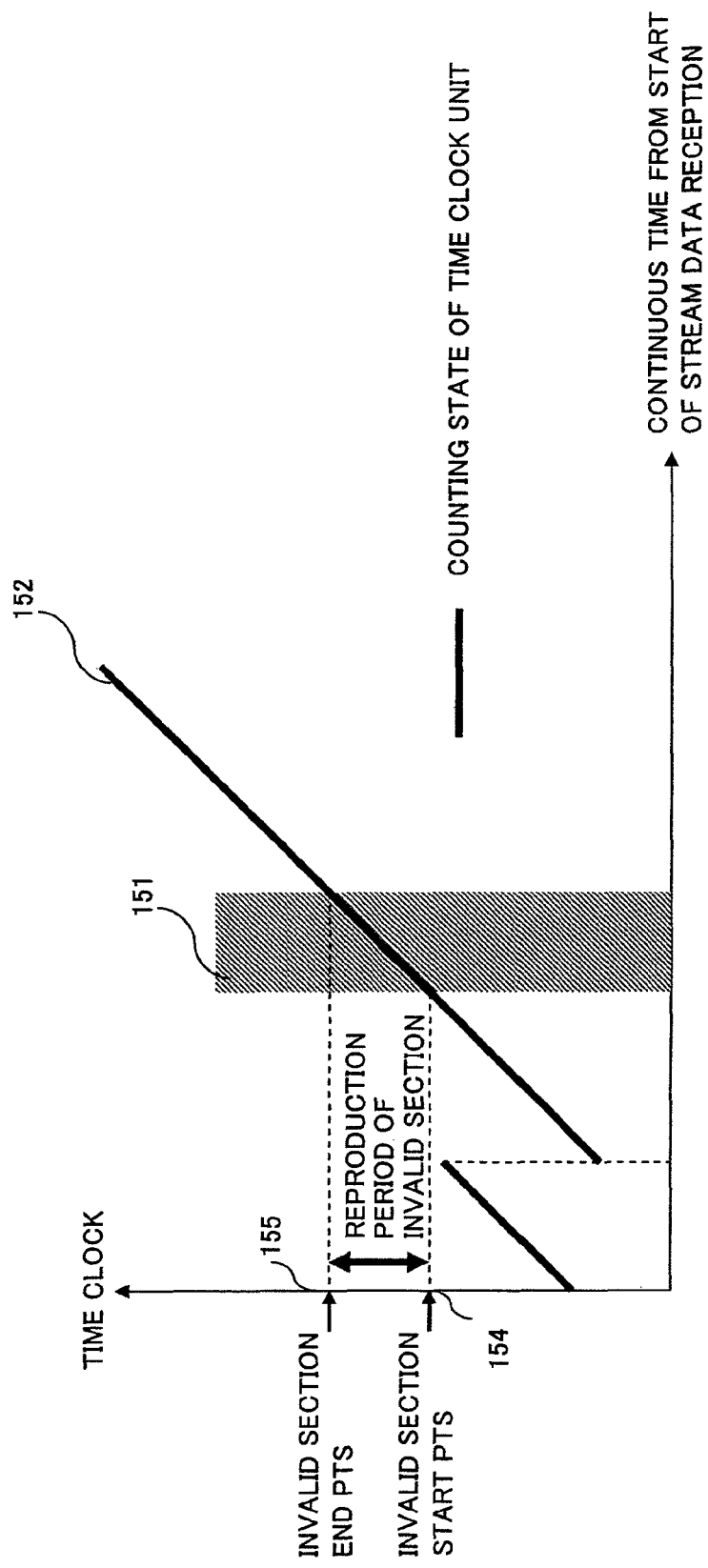
FIG. 21 shows how a time clock and a PTS included in stream data change when PCR reset does not occur in an invalid section.

FIG. 21 shows a PTS included in stream data and a state of change in time clock, when no PCR reset occurred in an invalid section. A horizontal axis shows a continuous time from the start of stream data reception, and a vertical axis shows a value of the time clock. A diagonally shaded area 151 shows an invalid section. A straight line 152 shows a counting state of the time clock unit 14. An invalid section start PTS 154 is a value of the time clock unit 14 at an output time of a video frame that is output before the invalid section occurs. An invalid section end PTS 155 is a value of a PTS got from a video PES header after the invalid section ends.

As shown in FIG. 21, in the case where no PCR reset occurred in the invalid section, a PCR included in the stream data and the time clock unit 14 remain synchronous with each other after the invalid section ends. In such a situation, since the invalid section end PTS 155 is set so that processing is performed based on a STC value shown by the time clock unit 14, a reproduction period corresponding to the invalid section is a difference between the invalid section end PTS 155 and the invalid section start PTS 154.

Figure 22:
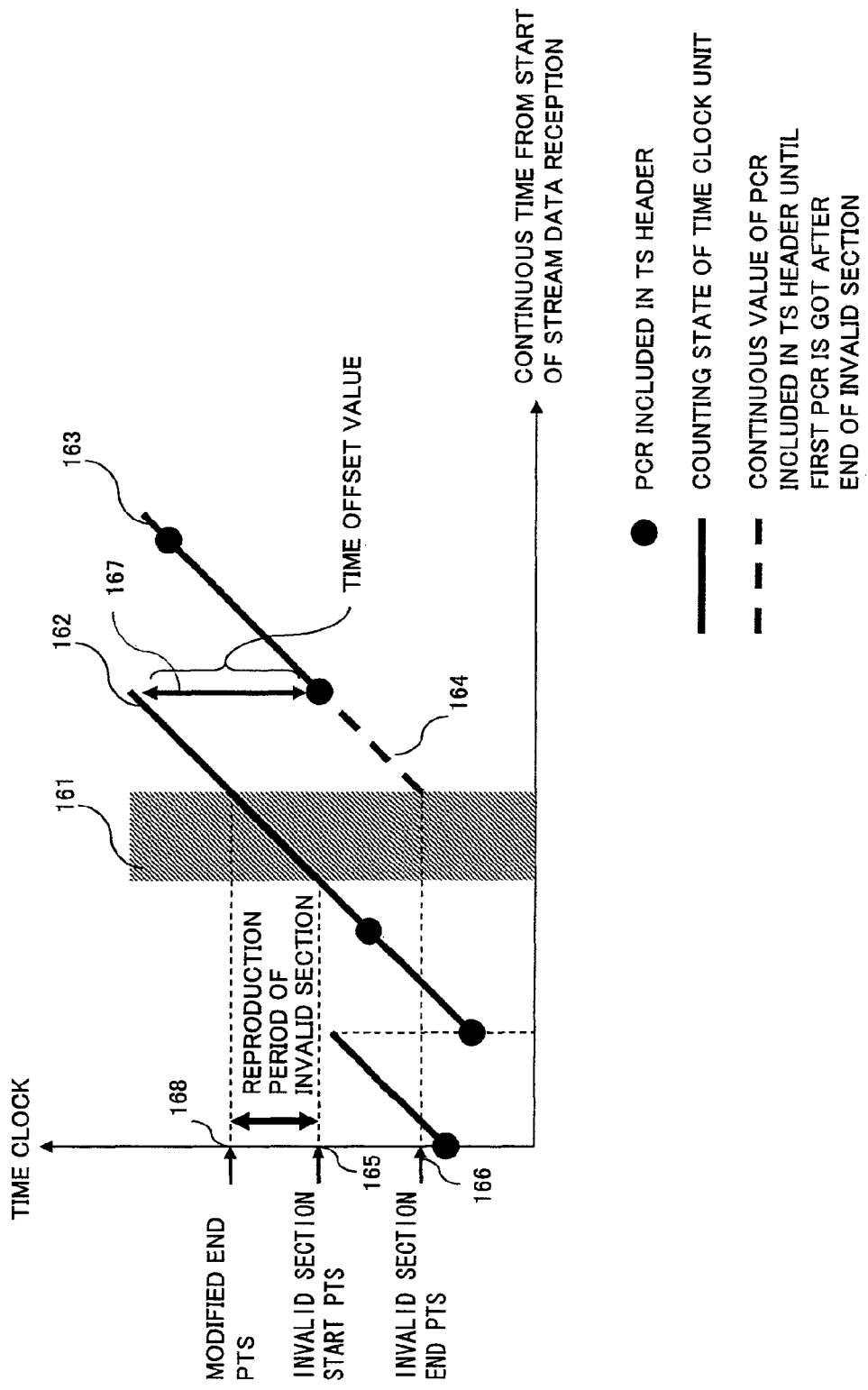
FIG. 22 shows how a time clock and a PTS included in stream data change.

On the other hand, FIG. 22 shows a PTS included in stream data and a state of change in time clock, in the case where PCR reset occurred in an invalid section. In FIG. 22, a horizontal axis shows a continuous time from the start of stream data reception. A vertical axis shows a value of the time clock. A diagonally shaded area 161 shows an invalid section. A black circle shows PCR time information included in a TS header. A straight line 162 and a straight line 163 show a counting state of the time clock unit 14. A broken line 164 shows a continuous PCR value included in a TS header until a PCR is first got after the end of the invalid section. An invalid section start PTS 165 shows a value of the time clock unit 14 at an output time of a video frame that is output before the invalid section occurs. An invalid section end PTS 166 shows a PTS value got from a video PES header after the invalid section ends. A time offset value 167 is a difference between the straight line 162 and the broken line 164.

As shown in FIG. 22, in the case where PCR reset occurred in the invalid section, a PCR and the time clock unit 14 are not synchronous with each other after the invalid section ends. The invalid section start PTS 165 is based on a PCR that precedes the PCR reset, and so is synchronous with the time clock unit 14. However, the invalid section end PTS 166 is set so that processing is performed based on a PCR that succeeds the PCR reset, and so is not synchronous with the time clock unit 14. Thus, the invalid section end PTS 166 and the invalid section start PTS 165 have different bases. Accordingly, merely calculating a difference between the invalid section end PTS 166 and the invalid section start PTS 165 cannot yield a reproduction period corresponding to the invalid section.

In view of this, the invalid section end PTS 166 is modified to have the same basis as the invalid section start PTS 165, by using the time offset value 167. A modified end PTS 168 is an invalid section end PTS obtained as a result of modifying the invalid section end PTS 166 by adding the time offset value 167 so as to have the same basis as the invalid section start PTS 165. The modified end PTS 168 and the invalid section start PTS 165 have the same basis, so that the reproduction period corresponding to the invalid section can be obtained by calculating a difference between the modified end PTS 168 and the invalid section start PTS 165.

Figure 23:
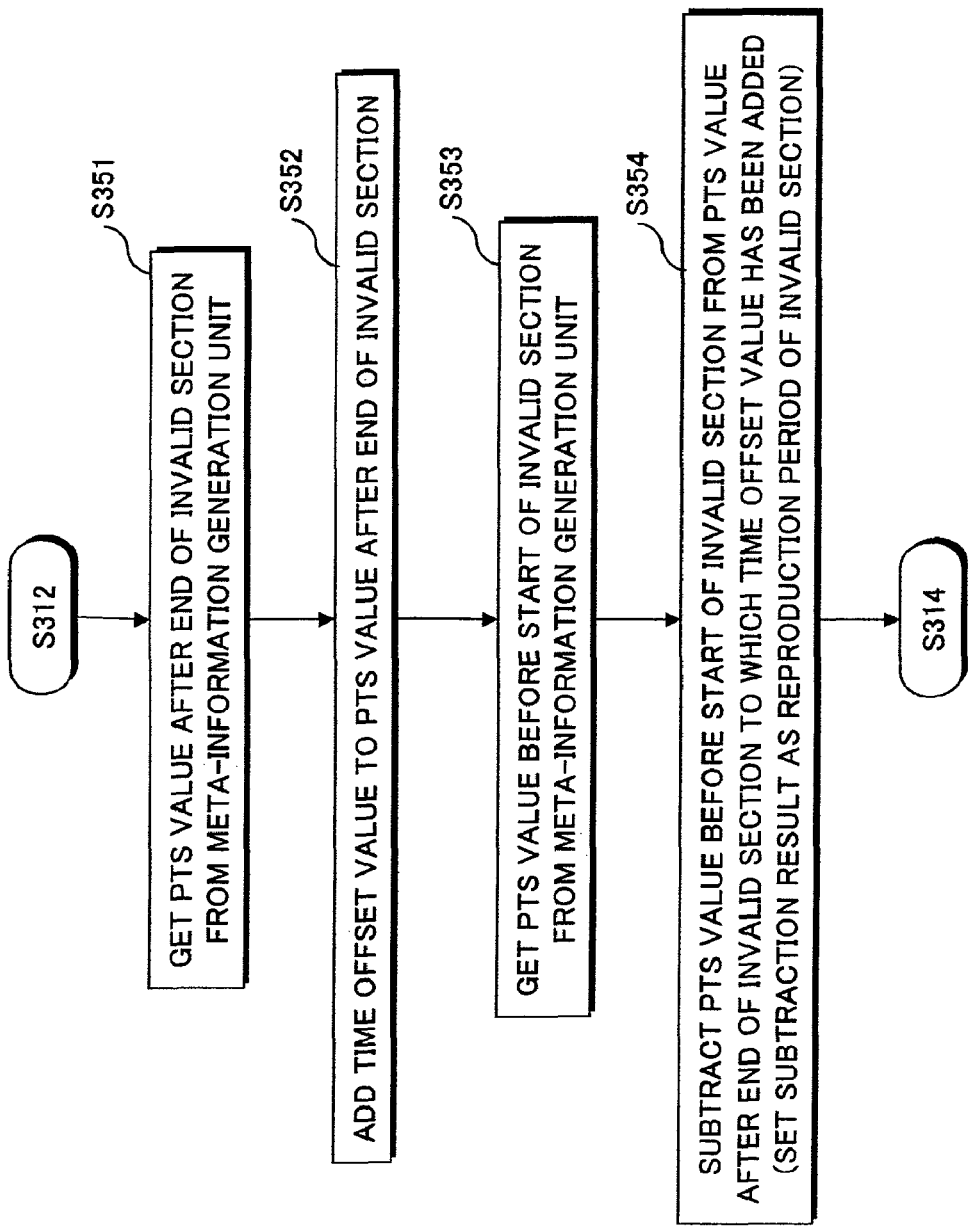
FIG. 23 is a flowchart showing a procedure of calculating a reproduction period by a reproduction period calculation unit 18.

The following describes a procedure for realizing the above reproduction period calculation method. FIG. 23 is a flowchart showing a procedure of calculating a reproduction period by the reproduction period calculation unit 18.

First, the reproduction period calculation unit 18 gets a missing endpoint PTS from the meta-information generation unit 19 (step S351). Also, if PCR reset occurred in an invalid section, the reproduction period calculation unit 18 gets a time offset value calculated by the reset detection unit 15. The reproduction period calculation unit 18 adds the time offset value to the missing endpoint PTS, thereby modifying the missing end point PTS (step S352). When doing so, the missing end point PTS in meta-information is not rewritten. If no PCR reset occurred in the invalid section, step S352 is not performed. Next, the reproduction period calculation unit 18 gets a missing start point PTS from the meta-information generation unit 19 (step S353). The reproduction period calculation unit 18 subtracts the missing start point PTS from the missing end point PTS, to calculate a reproduction period of stream data included in the invalid section (step S354). The reproduction period calculation unit 18 notifies the meta-information generation unit 19 of the calculated reproduction period (step S314).

This completes the description of the method of calculating a reproduction period corresponding to stream data included in an invalid section.

<PTS Interpolation Process>

As a modification example of the method of obtaining a missing start point PTS and a missing end point PTS, the following describes a method of obtaining PTSs that accurately match a missing start point and a missing end point, by interpolating a PTS for an audio frame and a video frame using a frame rate and PTS information included in a PES header.

Figure 24:
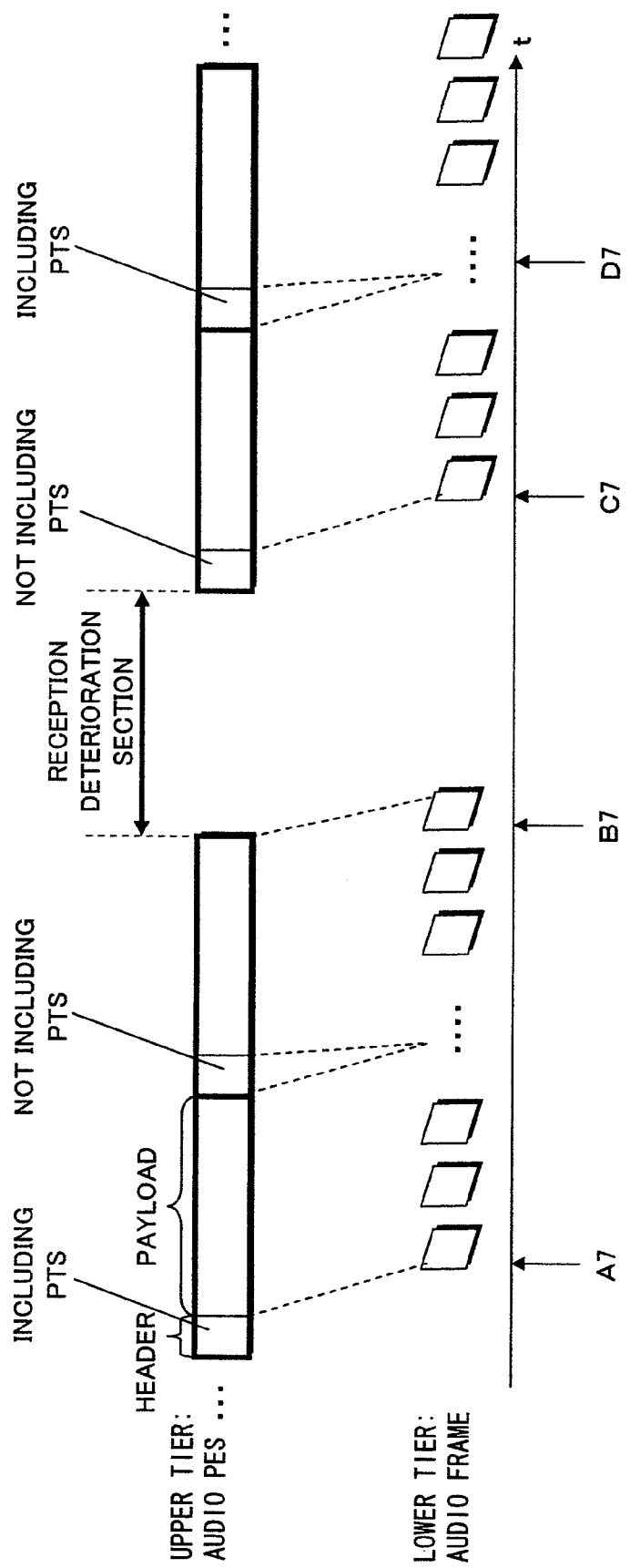
FIG. 24 shows a relation between an audio frame and a PTS included in an audio PES header.

FIG. 24 shows a relation between an audio frame and a PTS included in an audio PES header.

The upper tier shows an audio PES. The legend "including PTS" indicates a PES packet which contains PTS information in its PES header, whereas the legend "not including PTS" indicates a PES packet which does not contain PTS information in its PES header. A reception deterioration section is a section where the radio wave reception condition deteriorates and stream data cannot be got properly.

The lower tier shows audio frames generated by decoding the audio PES. When a PTS included in a PES header is used as a missing start PTS in step S305 in FIG. 20, a point A7 in FIG. 24 serves as a start point of an invalid section. This causes no audio frames from the point A7 to a point B7 to be output. However, by using an interpolated PTS at the point B7 as the missing start PTS instead of the PTS included in the PES header, it is possible to reproduce more stream data.

The method of calculating the PTS at the point B7 is given below. First, the stream data included from the point A7 to the point B7 is decoded and the number of frames is obtained. A reproduction period of the frames from the point A7 to the point B7 is calculated from the number of frames and a frame rate defined for the stream data. The PTS at the point B7 can be obtained by adding the calculated reproduction period to the PTS at the point A7. In the case of a fixed bit rate, it is also possible to calculate from a byte length of an audio ES from the point A7 to the point B7 and the bit rate.

Also, when a PTS included in a PES header is used as a missing end PTS in step S308 in FIG. 20, a point D7 in FIG. 24 serves as an end point of the invalid section. This causes no audio frames from a point C7 to the point D7 to be output. However, by using an interpolated PTS at the point C7 as the missing end PTS instead of the PTS included in the PES header in the same way as the missing start PTS, more stream data can be reproduced.

The method of calculating the PTS at the point C7 is given below. As in the method of calculating the PTS at the point B7, the PTS at the point C7 can be obtained by calculating a reproduction period of frames from the point C7 to the point D7 based on the number of frames included from the point C7 to the point D7 and a frame rate, and subtracting the calculated reproduction period from the PTS at the point D7.

Though audio data is used as one example here, it should be obvious that the same applies to video data.

This completes the description of the stream data recording device 7.

<Stream Data Reproducing Device>

Figure 25:
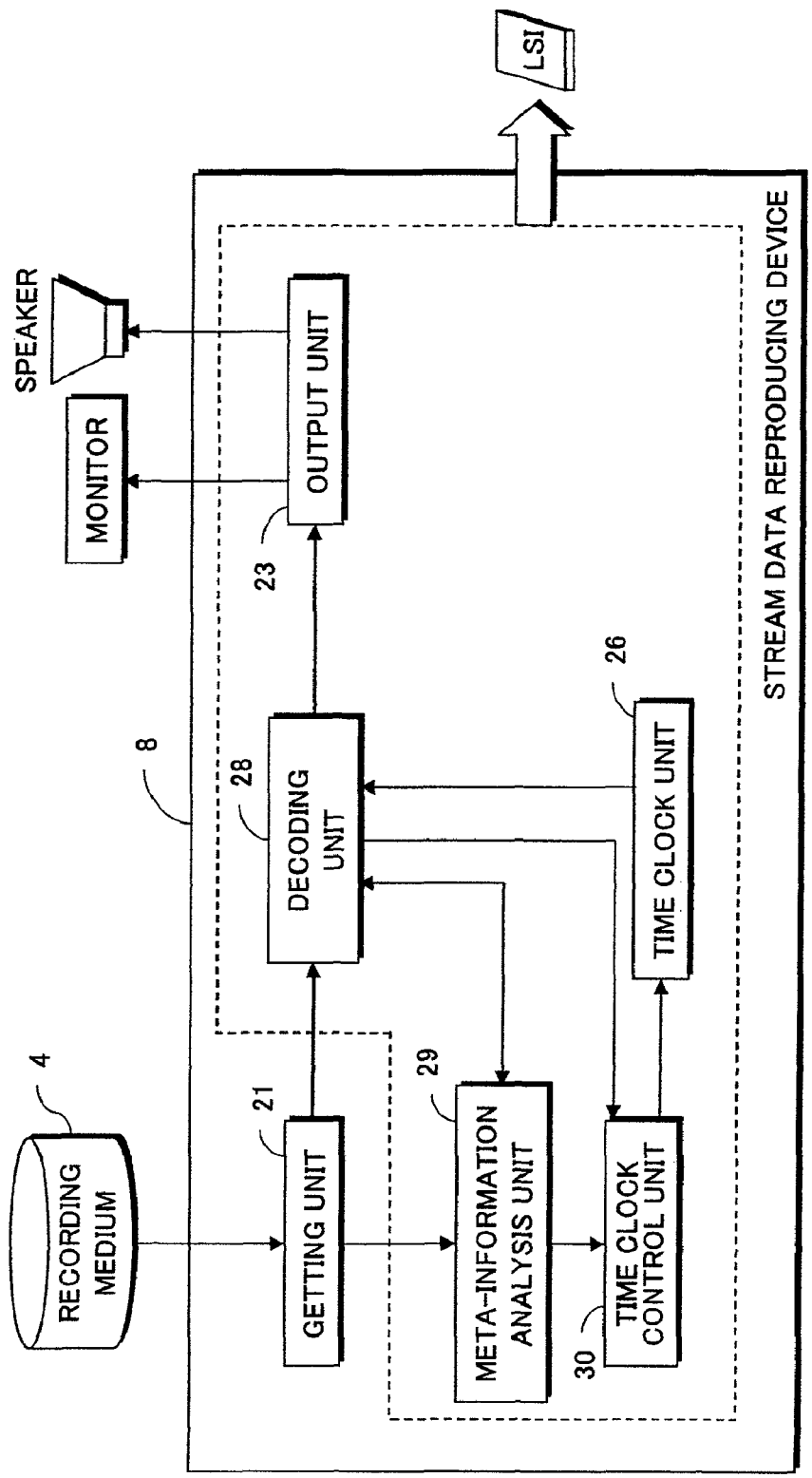
FIG. 25 shows an internal construction of a stream data reproducing device 8 according to the second embodiment.

The following describes a stream data reproducing device 8 that corrects a STC value using meta-information according to the second embodiment and reproduces stream data. FIG. 25 shows an internal construction of the stream data reproducing device 8 according to the second embodiment. The stream data reproducing device 8 has a construction in which the time clock unit 27 is omitted from the stream data reproducing device 6 shown in FIG. 15, and the decoding unit 22, the meta-information analysis unit 24, and the time clock control unit 25 in the stream data reproducing device 6 are respectively replaced with a decoding unit 28, a meta-information analysis unit 29, and a time clock control unit 30.

Construction elements which are the same as those in the stream data reproducing device 6 have been given the same reference numerals and their explanation has been omitted here.

The decoding unit 28, as with the decoding unit 22, decodes stream data got from the getting unit 21 to generate component data such as video data, audio data, subtitle data, and the like, and outputs, with reference to a STC value of the time clock unit 26, each component to the output unit 23 with a timing at which a PTS set in the component matches the clock value. Also, when PCR information is got from stream data, the decoding unit 28 notifies the time clock control unit 25 of a PCR value.

The decoding unit 28 differs from the decoding unit 22 in the following point. The decoding unit 28 judges whether or not data to be decoded is discontinuous from preceding data by referencing "discontinuity point index information" of meta-information and, if the data is discontinuous, keeps outputting a frame which was decoded immediately before, for a period of time shown by a "reproduction period" of the meta-information. After the time shown by the "reproduction period" has elapsed, the decoding unit 28 notifies the time clock control unit 30 that a reproduction period corresponding to an invalid section ends.

As a process that is performed when the decoding process has reached the data that is discontinuous from the preceding data, instead of displaying a still image of the frame decoded immediately before, the screen may be turned black or a color other than black for the period of time shown by the "reproduction period". As an alternative, as soon as the decoding process reaches the data that is discontinuous from the preceding data, a reproduction position may be jumped to the discontinuous data by instructing the time clock control unit 30 to reset the time clock value.

The meta-information analysis unit 29 analyzes meta-information got from the getting unit 21, and notifies the decoding unit 28 of "discontinuity point index information" and a "reproduction period". Also, the meta-information analysis unit 29 notifies the time clock control unit 30 of a "missing endpoint PTS" that is necessary to reset the STC value.

The time clock control unit 30 synchronizes the time clock unit 26 with the PCR value notified from the decoding unit 28. Also, when notified of the end of the reproduction period corresponding to the invalid section from the decoding unit 28, the time clock control unit 30 resets the time clock unit 26 to a time shown by the "missing end point PTS" notified from the meta-information analysis unit 29.

This completes the description of the internal construction of the stream data reproducing device 8.

<Stream Data Reproducing Method>

Figure 26:
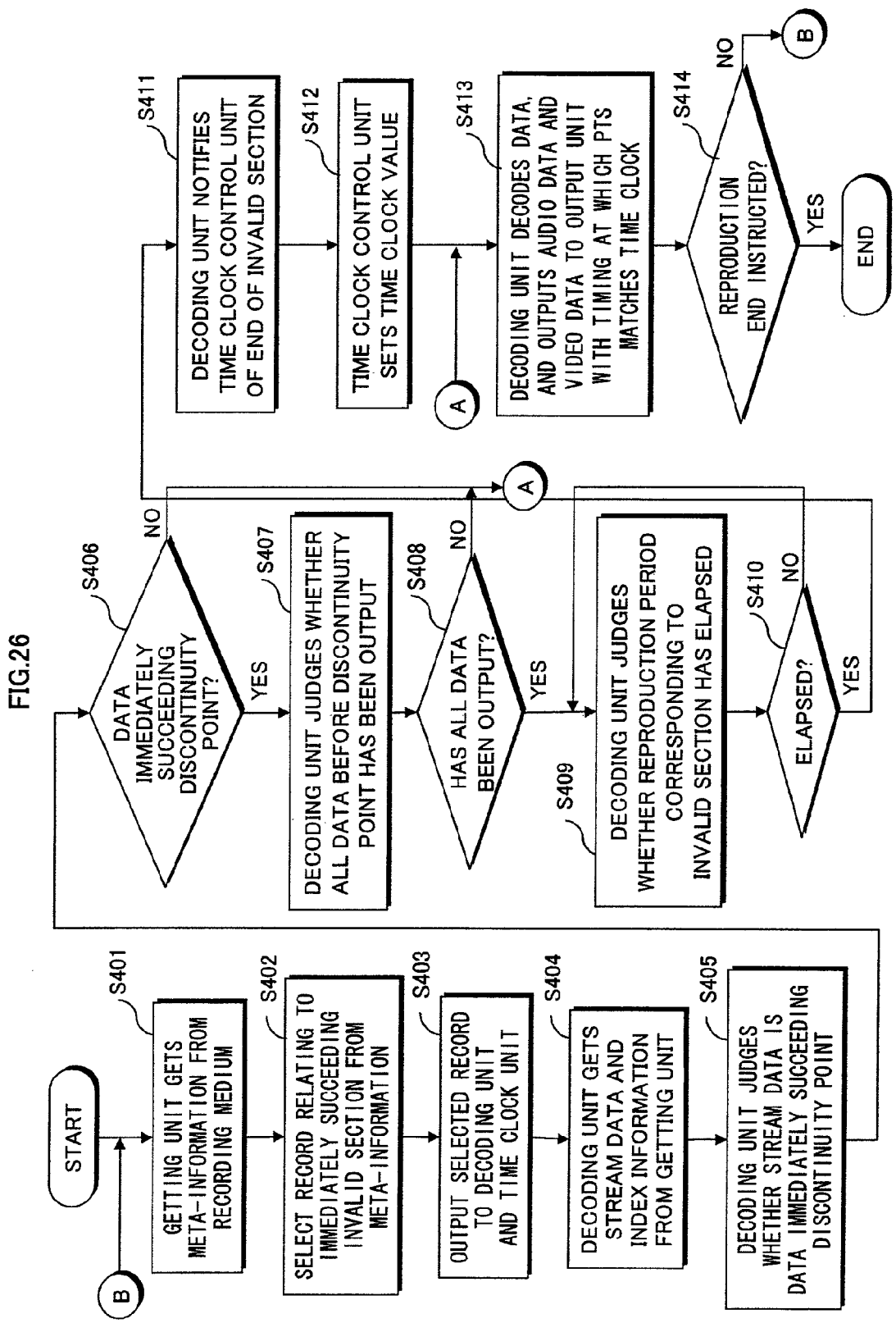
FIG. 26 shows a procedure of a stream data reproducing process in the stream data reproducing device 8 according to the second embodiment.

The following describes an operational procedure of getting stream data from the recording medium 4 and reproducing the stream data by the stream data reproducing device 8. FIG. 26 shows a procedure of a stream data reproducing process in the stream data reproducing device 8 according to the second embodiment.

When a reproducing process is launched in accordance with an instruction from the user, the getting unit 21 reads meta-information from the recording medium 4 and outputs it to the meta-information analysis unit 29 (step S401). The meta-information analysis unit 29 selects, among records registered in the meta-information, a record whose "discontinuity point index information" relates to a nearest invalid section after the current stream data reproduction position (step S402). The meta-information analysis unit 29 notifies the decoding unit 28 of the "discontinuity point index information" and a "reproduction period" of the selected record, and notifies the time clock control unit 30 of a "missing end point PTS" of the selected record (step S403).

The decoding unit 28 receives reproduction target stream data read from the recording medium 4 by the getting unit 21 and index information of the got part relative to a file beginning (step S404), and compares the index information from the file beginning with the "discontinuity point index information" of the meta-information got from the meta-information analysis unit 29, to judge whether or not stream data to be processed for reproduction is discontinuous from preceding data (step S405).

When the stream data to be processed is not discontinuous from the preceding data (step S406: NO), the decoding unit 28 performs a decoding process to generate video data, audio data, and subtitle data. After this, the decoding unit 28 outputs decoded data of each component to the output unit 23 with a timing at which a PTS of the component matches the STC value of the time clock unit 26 (step S413).

When the stream data to be processed is discontinuous from the preceding data (step S406), the decoding unit 28 judges whether or not all data preceding the "discontinuity point index information" of the meta-information has been output (step S407). For example, in the case where the reproduction target stream data has a discontinuous packet inserted therein at the time of recording, this judgment can be realized by checking, when outputting data generated as a result of the decoding process to the output unit 23, whether or not the processing has been performed up to the discontinuous packet. In the case where the reproduction target stream data does not have a discontinuous packet inserted therein at the time of recording, the decoding unit 22 may insert data indicating discontinuity at a discontinuous stream data position, when getting the stream data from the getting unit 21. As a result, when outputting data generated by the decoding process to the output unit 23, the decoding unit 22 can judge whether or not the processing has been performed up to the data indicating discontinuity.

If data preceding the discontinuity point remains (step S408: NO), step S413 is executed to reproduce and output the data preceding the discontinuity point. If the processing of all data preceding the discontinuity point is completed (step S408: YES), the decoding unit 28 judges whether or not the "reproduction period" of the meta-information has elapsed (step S409). This judgment can be performed as follows. First, the decoding unit 28 gets a STC value at an output time of the last data preceding the discontinuity point from the time clock unit 26, and adds the "reproduction period" of the meta-information to the STC value. The elapse of the reproduction period can be judged based on whether or not a result of the addition matches the clock value of the time clock unit 26.

If the reproduction period has not elapsed (step S410: NO), the decoding unit 28 waits until the reproduction period has elapsed, without outputting data succeeding the discontinuity point. When the reproduction period has elapsed (step S410: YES), the decoding unit 28 notifies the time clock control unit 30 that the reproduction period corresponding to the invalid section ends (step S411). Upon receiving the notification, the time clock control unit 30 resets the time clock unit 26 to the "missing end point PTS" notified from the meta-information analysis unit 29 in step S403 (step S412). After this, step S413 is executed to reproduce and output the data succeeding the discontinuity point.

The output unit 23 judges whether or not a reproduction stop instruction is issued from the user and whether or not the reproducing process has reached the file end (step S414). When there is a reproduction stop instruction (step S414: YES), the reproducing process ends. When there is no reproduction stop instruction (step S414: NO), the procedure returns to step S401 to process the next data.

This completes the description of the operational procedure of the stream data reproducing device 8.

Though the second embodiment of the present invention describes the case where video data is used to generate meta-information, audio data may instead be used.

According to the above embodiment, a reproduction period of one of video data and audio data in a section that cannot be received properly is estimated and meta-information including the reproduction period is generated and held. As a result, when reproducing stream data recorded in a poor radio wave reception condition, it is possible to perform reproduction with a timing intended by the broadcasting system.

Third Embodiment

The following describes a third embodiment of the present invention.
<Meta-Information>

Figure 27:
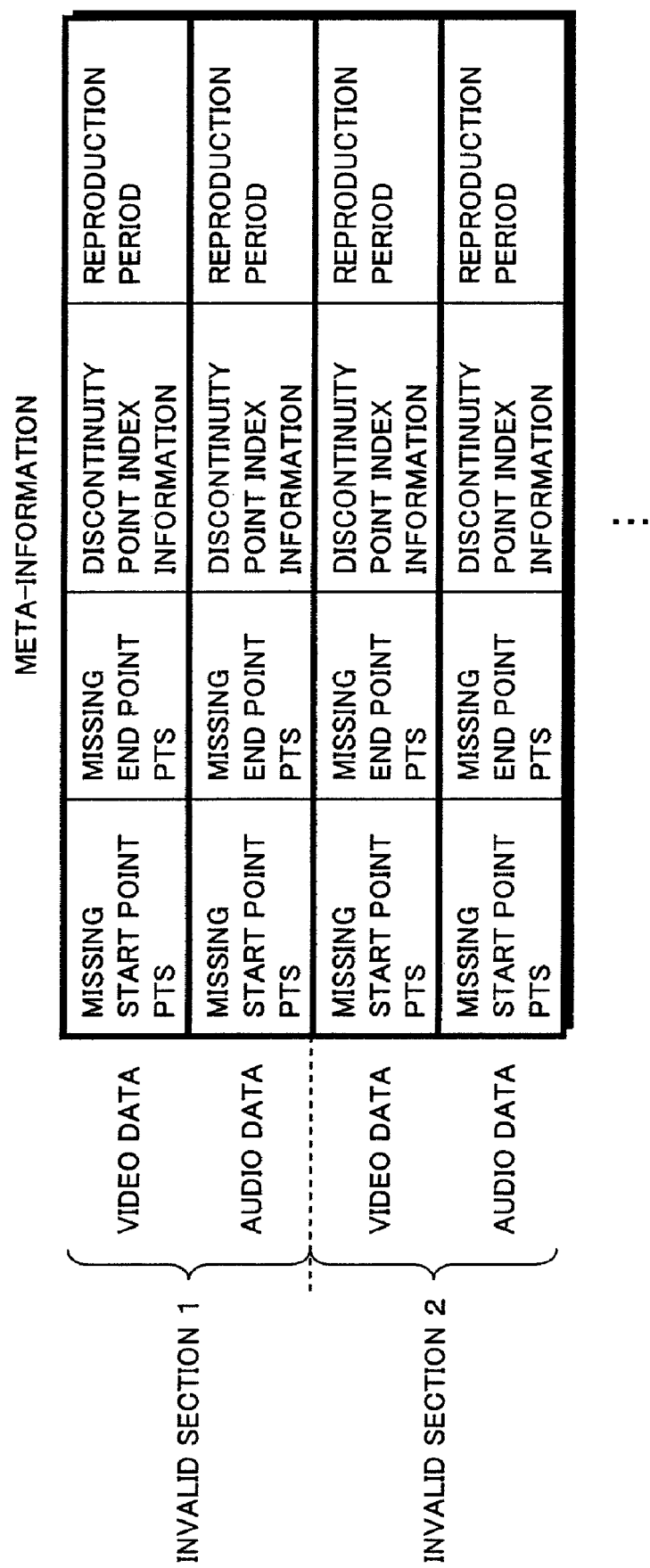
FIG. 27 shows a data structure of meta-information according to a third embodiment.

In the second embodiment of the present invention, meta-information is generated using time information of one of audio data and video data. In the third embodiment, on the other hand, meta-information is generated using time information of both audio data and video data. FIG. 27 shows a data structure of meta-information according to the third embodiment.

The meta-information according to this embodiment includes a record corresponding to video data and a record corresponding to audio data for each invalid section detected in stream data, and so is made up of records that are twice as many as the number of invalid sections. A record having an odd ordinal number is meta-information corresponding to video data, and a record having an even ordinal number is meta-information corresponding to audio data.

Each record is composed of a "missing start point PTS", a "missing end point PTS", "discontinuity point index information", and a "reproduction period".

The "missing start point PTS" is a PTS of an audio frame or a video frame of stream data received before an invalid section occurs.

The "missing end point PTS" is a PTS of an audio frame or a video frame of stream data received after the invalid section ends.

The "discontinuity point index information" is a position of a TS packet that includes the "missing endpoint PTS". A number assigned starting from a top one of recording target TS packets, an offset value from a file beginning, or the like can be used as data index information. In the third embodiment of the present invention, an offset value from a file beginning is used.

The "reproduction period" is a reproduction period of an audio frame or a video frame of stream data included in the invalid section, supposing that such stream data can be reproduced. A value obtained by subtracting the "missing start point PTS" from the "missing end point PTS" corresponds to the "reproduction period".
<Stream Data Recording Method>

The following describes a stream data recording process according to the third embodiment with reference to FIG. 20, focusing on the differences from the stream data recording process according to the second embodiment.

A first difference from the second embodiment lies in that, in step S305 executed when the start point of the invalid section is detected, a missing start point PTS is got for each of a video frame and an audio frame.

In detail, in step S305, the meta-information generation unit 19 gets a PTS of a video frame output before the occurrence of the invalid section, and holds the got PTS in a record of an odd ordinal number in the meta-information as "missing start point PTS" information of video data. Also, the meta-information generation unit 19 gets a PTS of an audio frame output before the occurrence of the invalid section, and holds the got PTS in a record of an even ordinal number in the meta-information as "missing start point PTS" information of audio data.

A second difference from the second embodiment lies in that, in step S308 executed when the endpoint of the invalid section is detected, a missing end point PTS is got for each of a video frame and an audio frame.

In detail, in step S308, the meta-information generation unit 19 gets a PTS of a video frame output after the end of the invalid section, and holds the got PTS in the record of the odd ordinal number in the meta-information as "missing end point PTS" information of video data. Also, the meta-information generation unit 19 gets a PTS of an audio frame output after the end of the invalid section, and holds the got PTS in the record of the even ordinal number in the meta-information as "missing end point PTS" information of audio data.

A third difference from the second embodiment lies in that, in step S309, recording index information is got for each of a video frame and an audio frame.

In detail, in step S309, the meta-information generation unit 19 gets a recording position of a TS packet including the "missing end point PTS" information of video data from the recording control unit 17, and holds the got recording position in the record of the odd ordinal number in the meta-information as "discontinuity point index information" of video data. Also, the meta-information generation unit 19 gets a recording position of a TS packet including the "missing end point PTS" information of audio data from the recording control unit 17, and holds the got recording position in the record of the even ordinal number in the meta-information as "discontinuity point index information" of audio data.

A fourth difference from the second embodiment lies in that, in step S313, a reproduction period corresponding to data included in the invalid section is calculated for each of a video frame and an audio frame.

In detail, in step S313, the reproduction period calculation unit 18 gets the "missing start point PTS" and the "missing end point PTS" of video data from the record of the odd ordinal number generated by the meta-information generation unit 19, and calculates a reproduction period corresponding to video data included in the invalid section. Also, the reproduction period calculation unit 18 gets the "missing start point PTS" and the "missing end point PTS" of audio data from the record of the even ordinal number generated by the meta-information generation unit 19, and calculates a reproduction period corresponding to audio data included in the invalid section. Note here that a time offset value is a difference between the PCR and the STC value of the time clock unit 14, and therefore is common to video data and audio data. Accordingly, the reproduction period of the video data and the reproduction period of the audio data can be calculated by the same logic.

This completes the description of the stream data recording method according to the third embodiment.

<Stream Data Reproducing Device>

Figure 28:
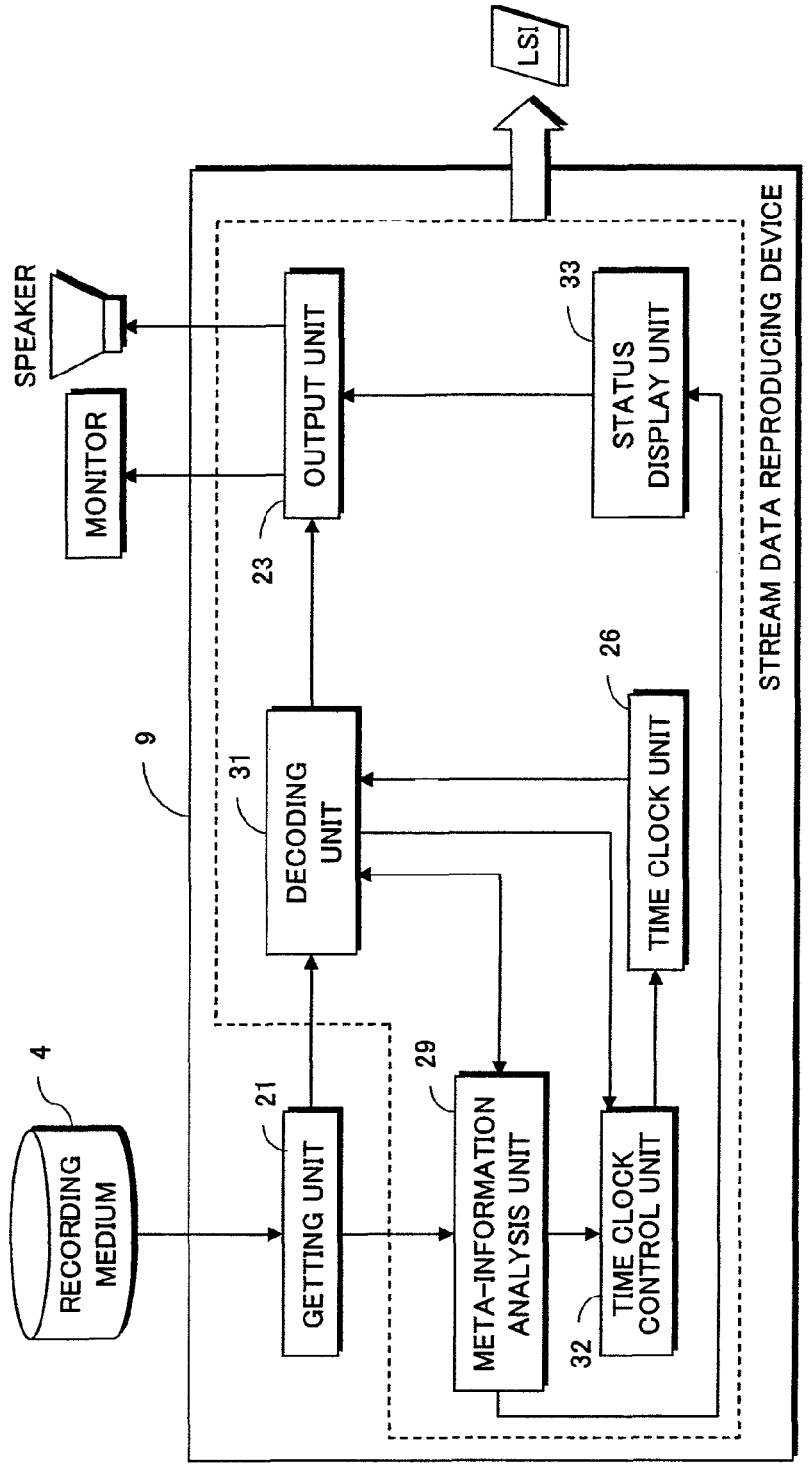
FIG. 28 shows an internal construction of a stream data reproducing device 9 according to the third embodiment.

The following describes a stream data reproducing device 9 that corrects the STC value using the meta-information according to the third embodiment and reproduces the stream data. FIG. 28 shows an internal construction of the stream data reproducing device 9 according to the third embodiment. The stream data reproducing device 9 has a construction in which a status display unit 33 is added to the stream data reproducing device 8 shown in FIG. 25, and the decoding unit 28 and the time clock control unit 30 in the stream data reproducing device 8 are respectively replaced with a decoding unit 31 and a time clock control unit 32.

Construction elements which are the same as those in the stream data reproducing device 8 have been given the same reference numerals and their explanation has been omitted here.

The decoding unit 31 decodes stream data got from the getting unit 21, to generate video data and audio data. The decoding unit 31 then references the time clock unit 26, and outputs the generated audio data or video data to the output unit 23 with a fixed interval that is based on a frame rate of the corresponding data.

Also, the decoding unit 31 judges whether or not data to be decoded is discontinuous from preceding data, with reference to "discontinuity point index information" of meta-information. If the data is discontinuous, the decoding unit 31 stops outputting to the output unit 23 for a period of time shown by a "reproduction period" of the meta-information.

The time clock control unit 32 resets the time clock unit 26 in accordance with a PCR in the stream data, when the reproduction begins. During the reproduction, the time clock control unit 32 does not reset the time clock unit 26.

The status display unit 33 gets the meta-information from the meta-information analysis unit 29, generates a screen for notifying the user that the stream data being recorded has an invalid section, and outputs the screen to a monitor via the output unit 23. For example, the display process by the status display unit 33 is performed by displaying, on a bar object representing the entire stream data, each invalid section with a proportion corresponding to a time length of the section, as shown in FIG. 29A. Alternatively, as shown in FIG. 29B, a position of each invalid section may be displayed on a bar object representing a length of reproducible stream data. Alternatively, as shown in FIG. 29C, a broadcast time period of recording target stream data and a reproducible time period of actually recorded stream data may be presented to the user. Also, when requesting the user to specify a jump destination, the status display unit 33 generates an image showing a section specifiable as a jump destination and a section unspecifiable as a jump destination on one bar object, and outputs it to the monitor, as shown in FIG. 29D.

Furthermore, during stream data reproduction, the status display unit 33 generates an image showing a reproduction status and outputs it to the monitor. FIG. 30A schematically shows the mobile reception terminal 3 on which the image showing the reproduction status is displayed. During stream data reproduction, a decoded reproduction image is displayed in an image output part 10a and reproduction status information generated by the status display unit 33 is displayed in a status display part 10b, on a monitor 10 of the mobile reception terminal 3. The reproduction status information displayed in the status display part 10b includes a reproduction position display bar object 10c and a reproduction period display 10d.

The following describes a method of displaying an image showing a reproduction status. FIG. 30B shows an example method of displaying an image showing a reproduction status.

The reproduction position display bar object 10c is a bar object representing a length of entire stream data. Each invalid section is displaced on the reproduction position display bar object 10c according to a position and a length of the section. Each section partitioned on the bar object is displayed in a color that differs depending on a type of component reproducible in that section. In more detail, a section 10e in which both video and audio are reproducible is displayed in green, a section 10f showing an invalid section of only one of video and audio is displayed in orange, and a section 10g in which invalid sections of both video and audio overlap with each other is displayed in red. Furthermore, a part of the reproduction position display bar object 10c corresponding to already reproduced stream data is enclosed by a thick line box from the left end, in order to make it easier to recognize the current reproduction position.

The reproduction period display 10d is a character string showing the current reproduction time and the reproduction period of the entire stream data side-by-side. The character string of the reproduction period display 10d is displayed when the current reproduction position is an invalid section of video and the image output part 10a is turned black. Here, a display color of the reproduction period display 10d may be changed according to a type of component being reproduced, in the same manner as the reproduction position display bar object 10c.

Furthermore, when the reproduction position reaches an invalid section in which invalid sections of both video and audio overlap with each other and whose "reproduction period" of meta-information is no smaller than a predetermined period (e.g. 10 seconds), a warning image such as a pop-up 10 h or an icon may be displayed in the image output part 10a. By making such a warning, the user can continuously recognize the reproduction for a long time, by performing an appropriate operation such as a skip operation.

This completes the description of the internal construction of the stream data reproducing device 9.

<Stream Data Reproducing Method>

Figure 31:
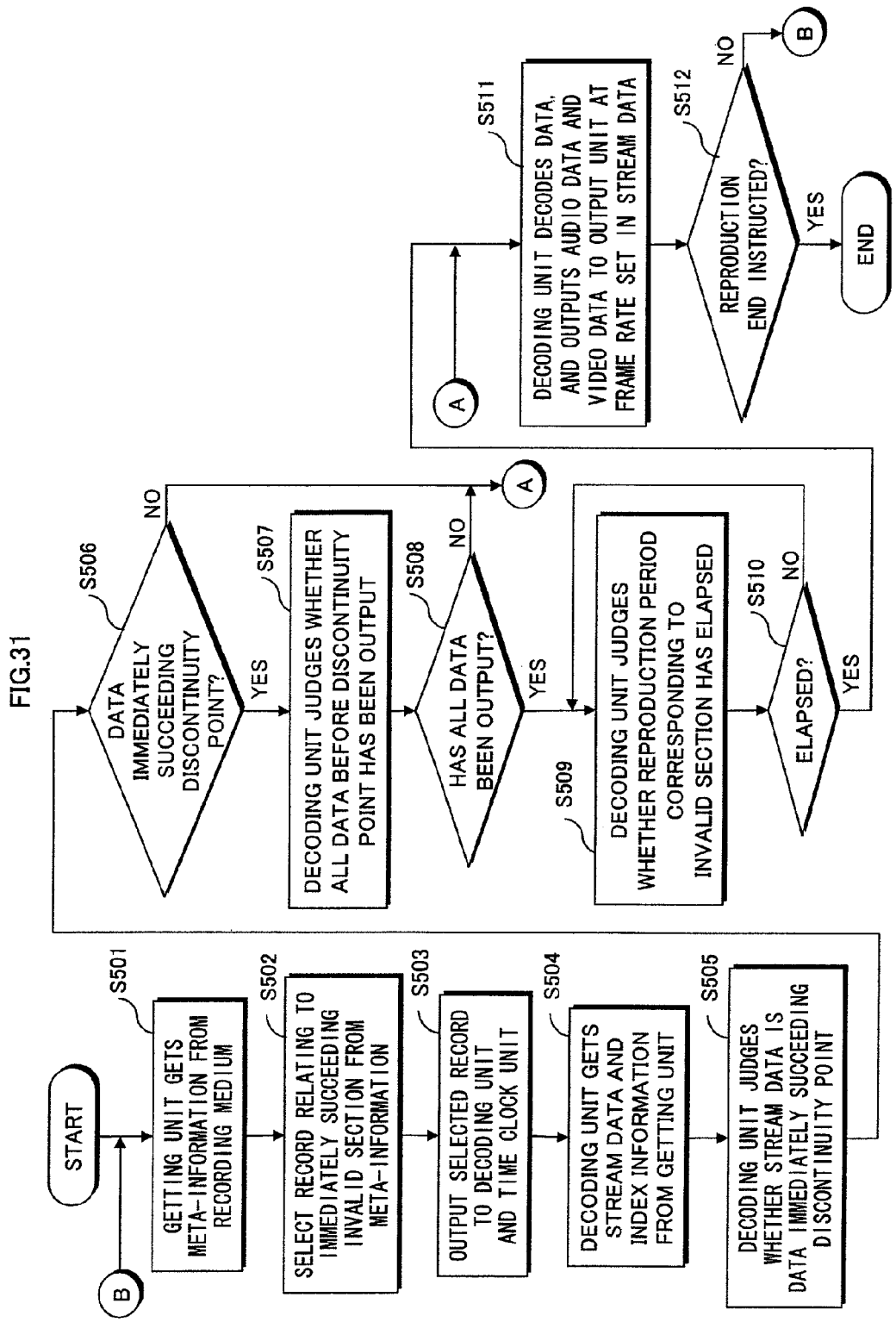
FIG. 31 shows a procedure of a stream data reproducing process in the stream data reproducing device 9 according to the third embodiment.

The following describes an operational procedure of getting stream data from the recording medium 4 and reproducing it by the stream data reproducing device 9. FIG. 31 shows a procedure of a stream data reproducing process in the stream data reproducing device 9 according to the third embodiment.

When a reproducing process is launched in accordance with an instruction from the user, the getting unit 21 reads meta-information from the recording medium 4 and outputs it to the meta-information analysis unit 29 (step S501). The meta-information analysis unit 29 selects, among records registered in the meta-information, a record of video data with an odd ordinal number whose "discontinuity point index information" relates to a nearest invalid section after the current stream data reproduction position, and a record of audio data with an even ordinal number following the odd ordinal number (step S502). The meta-information analysis unit 29 notifies the decoding unit 28 of the "discontinuity point index information" and "reproduction period" of the selected two records, and notifies the time clock control unit 30 of a "missing end point PTS" of the selected two records (step S503). The decoding unit 31 receives reproduction target stream data read from the recording medium 4 by the getting unit 21, and index information of the got part relative to a file beginning (step S504).

Subsequently, a process of steps S505-S511 is executed for each of audio data and video data in parallel.

In step S505, the decoding unit 31 judges whether or not video data to be processed for reproduction is discontinuous from preceding data, by referencing the "discontinuity point index information" of video data with the odd ordinal number in the meta-information. The decoding unit 31 also judges whether or not audio data to be processed for reproduction is discontinuous from preceding data, by referencing the "discontinuity point index information" of audio data with the even ordinal number in the meta-information.

When the video data or audio data to be processed is not discontinuous from the preceding data (step S506: NO), the decoding unit 31 performs a decoding process to generate video data or audio data. The decoding unit 31 outputs the generated audio data or video data to the output unit 23 with a fixed interval that is based on a frame rate of the data, by referencing the time clock unit 26 (step S511). Note here that, in step S511, a top audio frame and a top video frame at the start of the reproduction are each output with a timing at which a PTS of the frame matches the clock value of the time clock unit 26, and a subsequent audio frame and a subsequent video frame are each output with a fixed interval based on a corresponding frame rate.

When the video data or audio data to be processed is discontinuous from the preceding data (step S506: YES), the decoding unit 31 judges whether or not all video data preceding the "discontinuity point index information" with the odd ordinal number in the meta-information has been output, or whether or not all audio data preceding the "discontinuity point index information" with the even ordinal number in the meta-information has been output (step S507). If data preceding the discontinuity point remains (step S508: NO), step S511 is executed to output the data preceding the discontinuity point. When all video data preceding the discontinuity point has been output (step S508: YES), the decoding unit 31 judges whether or not the "reproduction period" of video data with the odd ordinal number in the meta-information has elapsed (step S509). When all audio data preceding the discontinuity point has been output (step S508: YES), the decoding unit 31 judges whether or not the "reproduction period" of audio data with the even ordinal number in the meta-information has elapsed (step S509). If the reproduction period has not elapsed (step S510: NO), the decoding unit waits for the elapse of the reproduction period, without outputting data succeeding the discontinuity point.

When the reproduction period has elapsed (step S510: YES), the decoding unit 31 executes step S511 to reproduce and output the data succeeding the discontinuity point. When reproducing and outputting the stream data succeeding the discontinuity point, the reproduction and output are launched with a timing at which the "reproduction period" of the meta-information has elapsed, and subsequently the stream data is output with the fixed interval based on the frame rate.

This completes the description of the operational procedure of the stream data reproducing device 9.

According to the above embodiment, reproduction periods of both video data and audio data in a section that could not be received properly are estimated and meta-information showing these reproduction periods is generated and held. At the time of reproduction, only the timings of starting video data and audio data are synchronized with PTSs, and the subsequent data is output based on the frame rate. When reproducing stream data recorded in a poor radio wave reception condition, the reproduction is put in a standby state for the reproduction period in the meta-information for each of video data and audio data. In this way, video data and audio data can be reproduced synchronously with a timing intended by the broadcasting system after the end of the invalid section.

Other Modifications

Although the present invention has been described by way of the above embodiments, it should be obvious that the present invention is not limited to the above. For example, the following modifications are applicable.

(1) The present invention also applies to the stream data recording method and reproducing method disclosed in the procedures of the flowcharts described in each of the above embodiments. The methods may be realized by a computer program that includes program code for having a computer operate according to the procedures. Such a computer program may be distributed as a digital signal.

The present invention may be realized by a computer-readable recording medium, such as a flexible disk, a hard disk, a CD-ROM, an MO, a DVD, a DVD-ROM, a DVD-RAM, a BD (Blu-ray Disc), or a semiconductor memory, on which the above computer program or digital signal is recorded.

The computer program or digital signal that achieves the present invention may also be transmitted via, for example, a network such as an electronic communications network, a wired or wireless communications network, or an internet.

The computer program or the digital signal may be provided to an independent computer system by distributing a recording medium on which the computer program or the digital signal is recorded, or by transmitting the computer program or the digital signal via a network. The independent computer system may then execute the computer program or the digital signal to function as the present invention.

(2) The present invention can also be realized by a LSI that controls the stream data recording device and the stream data reproducing device described in each of the first to third embodiments. Such a LSI can be achieved by integrating the functional blocks enclosed by a broken line box in each of FIGS. 5, 15, 19, 25, and 28. There functional blocks may be partially or entirely implemented by one chip.

Though the LSI is described here, the circuit may be called an IC, a system LSI, a super LSI, or an ultra LSI, depending on the degree of integration.

Also, the integration is not limited to the LSI, and may be performed using a dedicated circuit or a general processor. A FPGA (Field Programmable Gate Array) that can be programmed after LSI manufacturing or a reconfigurable processor capable of reconfiguring connections and settings of circuit cells in an LSI may be used.

Also, if an integrated circuit technique that replaces a LSI emerges from advancement of semiconductor technology or other derivative technology, such a technique can be used for the integration of the functional blocks and components. For instance, biotechnology may be adapted in this way.

(3) The first to third embodiments mainly describe the case of recording/reproducing stream data that is transmitted by a digital broadcast signal, but the same effects can equally be obtained for stream data received via a network.

The present invention is not limited to stream data got from a digital broadcast signal, and can also be realized as a stream data editing device that generates meta-information for stream data already recorded on a recording medium. In detail, such a stream data editing device can be realized by the construction shown in FIG. 5 or 19, where stream data already recorded on the recording medium 4 is read by the getting unit 11 and processed. According to this construction, it is possible to, after recording stream data got from a broadcast wave onto a recording medium, read the stream data and generate meta-information while the device is in an idle state or the like, which contributes to a reduction in processing load when recording stream data.

(4) The first to third embodiments describe the case where meta-information is recorded on the same recording medium as stream data, but stream data and meta-information according to the present invention may be recorded on separate recording media so long as they are associated with each other. As one example, the present invention can be applied in the following way. If the data size of the stream data is larger than the capacity of the recording medium, the stream data is recorded separately over a plurality of recording media, and meta-information of an invalid section in a part of stream data recorded on each recording medium is collectively recorded on one recording medium, with common IDs being respectively assigned to the parts of stream data and their corresponding meta-information.

(5) The above embodiments and modifications can be freely combined.

INDUSTRIAL APPLICABILITY

When recording stream data, the stream data recording device according to the present invention generates time offset information for correcting a STC value for a section in which a PCR included in the stream data is unknown due to deterioration in radio wave reception condition. When reproducing the stream data, the stream data reproducing device according to the present invention can reproduce the stream data with a timing intended by a broadcasting system, by correcting a time clock using this time offset information. Since the above effective measure can be taken even when the radio wave reception condition deteriorates during stream data recording, the present invention is useful for, for example, digital broadcast reception by a mobile reception terminal.

The invention claimed is:

1. A stream data reproducing device that reads stream data including pieces of clock reference information from a recording medium and reproduces the stream data, the stream data reproducing device comprising:
   a reading unit operable to read the stream data;
   a time clock unit operable to count a time synchronously with a time shown by each piece of clock reference information;
   an information getting unit operable to get index information and time correction information, the index information specifying a position, in the stream data, of an invalid section where a part of the stream data was missing, and the time correction information being used for correcting the time of the time clock unit;
   a resetting unit operable to reset the time clock unit based on the time correction information, when performing reproduction at the position specified by the index information; and
   a reproduction control unit operable to reproduce a frame in the stream data at a predefined presentation time, based on the time of the time clock unit;
   wherein the resetting unit resets the time clock unit when judging that the piece of clock reference information included in the invalid section shows a discontinuous time for synchronization of the time clock unit.

2. A stream data reproducing device that reads stream data including pieces of clock reference information from a recording medium and reproduces the stream data, the stream data reproducing device comprising:
   a reading unit operable to read the stream data;
   a time clock unit operable to count a time synchronously with a time shown by each piece of clock reference information;
   an information getting unit operable to get index information and time correction information, the index information specifying a position, in the stream data, of an invalid section where a part of the stream data was missing, and the time correction information being used for correcting the time of the time clock unit;
   a resetting unit operable to reset the time clock unit based on the time correction information, when performing reproduction at the position specified by the index information; and
   a reproduction control unit operable to reproduce a frame in the stream data at a predefined presentation time, based on the time of the time clock unit;
   wherein the reproduction control unit stops reproducing the frame in the stream data when the reproduction reaches a position specified by the index information and, in accordance with a time of the time clock unit after resetting by the resetting unit, resumes the reproduction from a frame in the stream data after the invalid section.

3. A stream data reproducing device that reads stream data including pieces of clock reference information from a recording medium and reproduces the stream data, the stream data reproducing device comprising:
   a reading unit operable to read the stream data;
   a time clock unit operable to count a time synchronously with a time shown by each piece of clock reference information;
   an information getting unit operable to get index information and time correction information, the index information specifying a position, in the stream data, of an invalid section where a part of the stream data was missing, and the time correction information being used for correcting the time of the time clock unit;
   a resetting unit operable to reset the time clock unit based on the time correction information, when performing reproduction at the position specified by the index information; and
   a reproduction control unit operable to reproduce a frame in the stream data at a predefined presentation time, based on the time of the time clock unit;
   wherein the time correction information includes:
      end time information showing the time of the time clock unit at an end of the invalid section when recording the stream data; and
      time offset information which is a difference between a time shown by a piece of clock reference information got after the end of the invalid section and the time of the time clock unit at the getting of the piece of clock reference information, when recording the stream data, wherein the time clock unit includes a first time clock and a second time clock each of which individually counts a time, wherein the resetting unit, when the stream data is read up to the position specified by the index information, sets one of the first time clock and the second time clock that is not being used by the reproduction control unit for the frame reproduction, to a time obtained by adding the end time information and the time offset information, and wherein the reproduction control unit, when the reproduction reaches the position specified by the index information, switches a time clock used for the frame reproduction, from the other one of the first time clock and the second time clock to the one of the first time clock and the second time clock.

4. A stream data reproducing device that reads stream data including pieces of clock reference information from a recording medium and reproduces the stream data, the stream data reproducing device comprising:

a reading unit operable to read the stream data;

a time clock unit operable to count a time synchronously with a time shown by each piece of clock reference information;

an information getting unit operable to get index information and time correction information, the index information specifying a position, in the stream data, of an invalid section where a part of the stream data was missing, and the time correction information being used for correcting the time of the time clock unit;

a resetting unit operable to reset the time clock unit based on the time correction information, when performing reproduction at the position specified by the index information; and a reproduction control unit operable to reproduce a frame in the stream data at a predefined presentation time, based on the time of the time clock unit wherein the time correction information includes:

missing time information showing a reproduction period corresponding to the missing part of the stream data in the invalid section; and a presentation time defined in a frame of at least one of video, audio, and subtitles that is included in the stream data after an end of the invalid section, wherein the reproduction control unit, when the reproduction of the stream data reaches the position specified by the index information, stops the reproduction of the stream data for the reproduction period shown by the missing time information, and resumes the reproduction from the frame in which the presentation time is defined after the reproduction period has elapsed in a state where the reproduction is stopped, and wherein the resetting unit sets the time clock unit to the presentation time, after the reproduction period has elapsed from when the reproduction is stopped.

5. A stream data reproducing device that reads stream data including pieces of clock reference information from a recording medium and reproduces the stream data, the stream data reproducing device comprising:

a reading unit operable to read the stream data;

a time clock unit operable to count a time synchronously with a time shown by each piece of clock reference information;

an information getting unit operable to get index information and time correction information, the index information specifying a position, in the stream data, of an invalid section where a part of the stream data was missing, and the time correction information being used for correcting the time of the time clock unit;

a resetting unit operable to reset the time clock unit based on the time correction information, when performing reproduction at the position specified by the index information;

a reproduction control unit operable to reproduce a frame in the stream data at a predefined presentation time, based on the time of the time clock unit; and a status display unit operable to display an object that represents an entire length of the stream data recorded on the recording medium;

wherein, when the invalid section is located in the stream data, the status display unit displays a position of the invalid section on the object.

6. The stream data reproducing device of claim 5, wherein when the invalid section is located in the stream data, the status display unit displays a first region and a second region on the object so as to be mutually distinguishable, the first region indicating a position and a length of a section to which a jump is possible, the second region indicating a position and a length of a section to which a jump is not possible.

7. The stream data reproducing device of claim 5, wherein when the invalid section is located in the stream data, the status display unit displays a position, a length, and a region indicating a quality level of the invalid section on the object.

* * * * *